United States Patent
Sato et al.

(10) Patent No.: US 7,929,089 B2
(45) Date of Patent: Apr. 19, 2011

(54) OPTICAL COMPENSATION FILM, POLARIZING PLATE, AND LIQUID-CRYSTAL DISPLAY DEVICE

(75) Inventors: Hiroshi Sato, Minami-ashigara (JP); Tomonori Ichinose, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 398 days.

(21) Appl. No.: 12/239,132

(22) Filed: Sep. 26, 2008

(65) Prior Publication Data
US 2009/0091691 A1   Apr. 9, 2009

(30) Foreign Application Priority Data

Sep. 27, 2007  (JP) ................................ 2007-251748
Sep. 9, 2008   (JP) ................................ 2008-230530

(51) Int. Cl.
*G02F 1/1335*   (2006.01)
(52) U.S. Cl. .......................... 349/119; 349/117; 349/118
(58) Field of Classification Search ........................ None
See application file for complete search history.

(56) References Cited

U.S. PATENT DOCUMENTS 7,557,883 B2 *   7/2009   Kawamoto et al. ........... 349/119

FOREIGN PATENT DOCUMENTS

| JP | 2002-169023 A | 6/2002 |
|---|---|---|
| JP | 2003-021718 A | 1/2003 |

* cited by examiner

*Primary Examiner* — Richard H Kim
(74) *Attorney, Agent, or Firm* — Buchanan Ingersoll & Rooney PC

(57) ABSTRACT

Disclosed is an optical compensation film comprising first and second optically-anisotropic layers, wherein retardation in plane at a wavelength of 550 nm, Re(550), of the first optically-anisotropic layer is from 20 to 40 nm, the first optically-anisotropic layer does not have any direction in which its retardation at a wavelength of 550 nm is 0 nm, the direction in which the absolute value of retardation of the first optically-anisotropic layer is the smallest is neither in the normal line direction of the layer nor in the in-plane direction thereof, and Re(550) of the second optically-anisotropic layer is from 20 to 150 nm and retardation along thickness direction at a wavelength of 550 nm, Rth(550), thereof is from 40 to 110 nm.

6 Claims, 2 Drawing Sheets

OPTICAL COMPENSATION FILM, POLARIZING PLATE, AND LIQUID-CRYSTAL DISPLAY DEVICE

CROSS-REFERENCE TO RELATED APPLICATIONS

This application claims benefit of priority under 35 U.S.C. 119 to Japanese Patent Application Nos. 2007-251748 filed on Sep. 27, 2007, and 2008-230530 filed on Sep. 9, 2008; and the entire contents of the application are incorporated herein by reference.

BACKGROUND OF THE INVENTION

1. Field of the Invention

The present invention relates to an optical compensation film and a liquid-crystal display device, and in particular, to an optical compensation film useful for optical compensation of TN-mode liquid-crystal display devices, and to a TN-mode liquid-crystal display device comprising it.

2. Related Art

Heretofore, various optical compensation films having, on a transparent support, an optically-anisotropic layer formed of a liquid-crystal composition have been proposed for optical compensation films of TN-mode liquid-crystal display devices. The optical compensation film having such a constitution is generally so designed that the optically-anisotropic layer thereof formed of a liquid-crystal composition has retardation necessary for optical compensation of a TN-mode liquid-crystal cell so as to be able to compensate a TN-mode liquid-crystal cell to thereby widen a viewing angle. And optical compensation sheets are known, in which the optical properties of the transparent support of a polymer film or the like to support the optically-anisotropic layer formed of a liquid-crystal composition are adjusted to the predetermined range (for example, as described in JPA Nos. 2002-169023 and 2003-21718).

However, in the embodiments where the conventional optical compensation film having the above described constitution is actually used in a TN-mode liquid-crystal display device, and when the device is watched in oblique horizontal directions in the white state, then the panel that should be white may often look yellowish. In particular, in many cases, the display panel of TVs and TV function-having PCs may be watched by plural viewers in various directions; and the viewing angle characteristics satisfactory for conventional PC display monitors are not satisfactory for TVs (or display monitors of TV function-having PCs).

SUMMARY OF THE INVENTION

An object of the invention is to provide a novel optical compensation film capable of contributing toward improving the viewing angle characteristics of liquid-crystal display devices, in particular toward reducing the yellow color shift that may occur in oblique horizontal directions in the white state.

Another object of the invention is to provide a liquid-crystal display device having improved viewing angle characteristics, in particular to provide the device in which the yellow color shift to occur in oblique horizontal directions in the white state is reduced.

The means for achieving the above mentioned objects are as follows.

[1] An optical compensation film comprising, at least, first and second optically-anisotropic layers, wherein:
retardation in plane at a wavelength of 550 nm, Re(550), of the first optically-anisotropic layer is from 20 to 40 nm, the first optically-anisotropic layer does not have any direction in which its retardation at a wavelength of 550 nm is 0 nm, the direction in which the absolute value of retardation of the first optically-anisotropic layer is the smallest is neither in the normal line direction of the layer nor in the in-plane direction thereof, and
Re(550) of the second optically-anisotropic layer is from 20 to 150 nm and retardation along thickness direction at a wavelength of 550 nm, Rth(550), thereof is from 40 to 110 nm.

[2] The optical compensation film as set forth in [1], wherein the second optically-anisotropic layer is a cellulose acylate film.

[3] The optical compensation film as set forth in [1], wherein the second optically-anisotropic layer is a norbornene-type polymer film, a cyclic olefin-type polymer film or a polycarbonate film.

[4] The optical compensation film as set forth in any one of [1] to [3], which is an optical compensation film to be used for TN-mode liquid-crystal display devices.

[5] A polarizing plate comprising an optical compensation film as set forth in any one of [1] to [4] and a polarizing film, wherein the in-plane slow axis of the optical compensation film and the in-plane transmission axis of the polarizing film is parallel to each other.

[6] A liquid-crystal display device comprising:
a liquid-crystal cell comprising a pair of substrates at lease one of which has an electrode and which are disposed to face each other, and a liquid-crystal layer sandwiched between the pair of substrates and containing a nematic liquid-crystal material in which liquid-crystal molecules of the nematic liquid-crystal material are aligned vertically to the surfaces of the pair of substrates in the black state,
a first polarizing film and a second polarizing film disposed to sandwich the liquid-crystal cell therebetween, and
two optical compensation films as set forth in claim 1, one of which is disposed between the liquid-crystal layer and the first polarizing film and another of which is disposed between the liquid-crystal layer and the second polarizing film.

Figure 1:
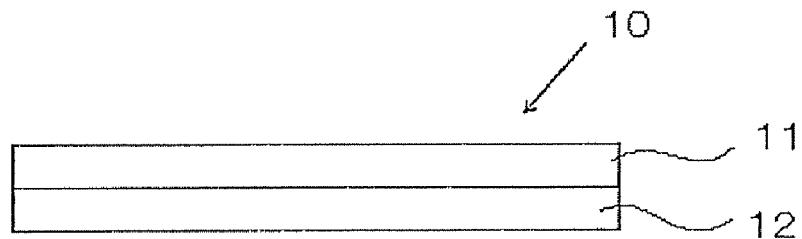
FIG. 1 is a schematic cross-sectional view of one embodiment of an optical compensation film of the invention.

In the drawings, the reference numerals have the following meanings:

10 Optical compensation film
11 First optically-anisotropic layer
12 Second optically-anisotropic layer
13 Polarizing film
14 Protective film
15 Polarizing plate
16 Liquid-crystal cell
17 TN-mode liquid-crystal display device

PREFERRED EMBODIMENT OF THE INVENTION

The invention will be described in detail below. The expression "from a lower value to an upper value" referred herein means that the range intended by the expression includes both the lower value and the upper value.

In the description, Re(λ) and Rth(λ) each indicate a retardation in plane (unit:nm) and a retardation along thickness direction (unit:nm) at a wavelength λ. Re(λ) is measured by applying a light having a wavelength of λ nm in the normal line direction of a sample such as a film, using KOBRA-21ADH or WR (by Oji Scientific Instruments).

When the sample to be tested is represented by an uniaxial or biaxial refractive index ellipsoid, then its Rth(λ) is calculated according to the method mentioned below.

With the in-plane slow axis (determined by KOBRA 21ADH or WR) taken as the inclination axis (rotation axis) of the sample (in case where the sample has no slow axis, the rotation axis of the sample may be in any in-plane direction of the sample), Re(λ) of the sample is measured at 6 points in all thereof, up to +50° relative to the normal line direction of the sample at intervals of 10°, by applying a light having a wavelength of λ nm from the inclined direction of the sample.

With the in-plane slow axis from the normal line direction taken as the rotation axis thereof, when the sample has a zero retardation value at a certain inclination angle, then the symbol of the retardation value of the sample at an inclination angle larger than that inclination angle is changed to a negative one, and then applied to KOBRA 21ADH or WR for computation.

With the slow axis taken as the inclination axis (rotation axis) (in case where the sample has no slow axis, the rotation axis of the sample may be in any in-plane direction of the film), the retardation values of the sample are measured in any inclined two directions; and based on the data and the mean refractive index and the inputted thickness of the sample, Rth may be calculated according to the following formulae (1) and (2):

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (1)$$

$$Rth=\{(nx+ny)/2-nz\} \times d \quad (2)$$

wherein Re(θ) means the retardation value of the sample in the direction inclined by an angle θ from the normal line direction; nx means the in-plane refractive index of the sample in the slow axis direction; ny means the in-plane refractive index of the sample in the direction vertical to nx; nz means the refractive index of the sample vertical to nx and ny; and d is a thickness of the sample.

When the sample to be tested can not be represented by a uniaxial or biaxial index ellipsoid, or that is, when the sample does not have an optical axis, then its Rth(λ) may be calculated according to the method mentioned below.

With the in-plane slow axis (determined by KOBRA 21ADH or WR) taken as the inclination axis (rotation axis) of the sample, Re(λ) of the sample is measured at 11 points in all thereof, from −50° to +50° relative to the normal line direction of the sample at intervals of 10°, by applying a light having a wavelength of λ nm from the inclined direction of the sample. Based on the thus-determined retardation data of Re(λ), the mean refractive index and the inputted thickness of the sample, Rth(λ) of the sample is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

The mean refractive index and the film thickness are inputted in KOBRA 21ADH or WR, nx, ny and nz are calculated therewith. From the thus-calculated data of nx, ny and nz, Nz=(nx−nz)/(nx−ny) is further calculated.

In this description, Re and Rth are at a wavelength of 550 nm unless the wavelength in their measurement is not specifically defined. In this description, the numerical data and the numerical ranges indicating optical characteristics and others should be interpreted as numerical data and numerical ranges that include generally-acceptable errors for liquid-crystal display devices and their constitutive members, as well as the directions of optical axes such as a polarizing axis of a polarizer and a slow axis of an optically anisotropic layer and the angles between them.

[Optical Compensation Film]

The invention relates to an optical compensation film having at least first and second optically-anisotropic layers, which is characterized in that retardation in plane at a wavelength of 550 nm, Re(550), of the first optically-anisotropic layer is from 20 to 40 nm, Re(550) of the second optically-anisotropic layer is from 20 to 150 nm, and retardation along the thickness direction at a wavelength of 550 nm, Rth(550) of the second optically-anisotropic layer is from 40 to 110 nm.

As a result of assiduous investigations, the present inventors have found that the yellow color shift in oblique horizontal directions to occur in liquid crystal display devices employing a conventional optical compensation film that comprises an optically-anisotropic layer of a liquid-crystal composition formed on a transparent support thereof can be solved by reducing retardation of the optically-anisotropic layer. However, optical compensation of liquid-crystal cells requires a retardation falling within a predetermined range, and reducing retardation of an optically-anisotropic layer may worsen viewing angle characteristics. According to the present invention, the transparent support to be used is so designed as to be able to share a part of retardation necessary for optical compensation, whereby the yellow color shift, that may occur when a liquid crystal display device in the white state is watched in oblique horizontal directions, is reduced; and the optical compensation film can achieve the optical compensatory function thereof.

In general, in a TN-mode liquid-crystal display device, two polarizing plates are disposed to sandwich a cell therebetween with their transmission axes kept perpendicular to each other. As compared with when being watched in the front direction (in the normal line direction) thereof, when being watched in oblique horizontal directions, the apparent crossing angle of the transmission axes reduces and the two axes are not perpendicular to each other. On the other hand, the refractivity anisotropy of a liquid-crystal cell is large in a short wavelength region, and therefore, among the light to pass through the liquid-crystal cell, the light having a shorter wavelength rotates with a larger rotatory angle. The optical rotation of the TN-mode liquid-crystal cell varying depending on the wavelength of light (optical rotatory dispersion) may be a cause of the yellow color shift occurring when a TN-mode liquid-crystal display device in the white state is watched in oblique horizontal directions. More concretely, among the light entering a TN-mode liquid-crystal cell in an oblique horizontal direction thereof, the components of the light having a wavelength falling within the short wavelength region may be rotated with a large rotatory angle and may not go out through the polarizer on the opposite light-going-out side since the apparent crossing angle of the transmission axes of the two polarizers, one on the light-coming-in side and the other on the light-going-out side is small; and as a result, the amount of the component having a wavelength falling with the longer wavelength region that passes through the polarizer on the light-going-out side increases relatively thereby causing the yellow color shift phenomenon to occur on the display panel that should be originally white. The refractivity anisotropy of the first optically-anisotropic layer (concretely, an optically-anisotropic layer formed by fixing a liquid-crystal composition in a hybrid alignment state) is large in a short wavelength region, and therefore in the embodiments where the first optically-anisotropic layer is disposed between a TN-mode liquid-crystal cell and a polarizer, the rotation of the light having a wavelength falling within the short wavelength region may be thereby increased further more with the result that the yellow color shift in oblique horizontal directions becomes more remarkable. Accordingly, the yellow color shift in oblique horizontal direction mentioned above could be reduced by reducing the refractivity anisotropy of the first optically-anisotropic layer; but at the same time, the viewing angle compensation to be attained by the refractivity anisotropy may also be reduced and the display performance of the device may be thereby deteriorated. To solve the problem, therefore, as combined with the first optically-anisotropic layer, a second optically-anisotropic layer (concretely, a polymer film) is used additionally which has a large refractivity anisotropy in a long wavelength region or of which the difference between the refractivity anisotropy in a long wavelength region and that in a short wavelength region is small, whereby the refractivity anisotropy that is insufficient in the first optically-anisotropic layer is compensated by the second optically-anisotropic layer and the device can thereby maintain the conventional optical compensation capability to achieve wide viewing angles, and at the same time, the yellow color shift occurring when the device in the white state is watched in oblique horizontal directions can be reduced.

FIG. 1 shows a schematic cross-sectional view of one embodiment of an optical compensation film of the invention. The optical compensation film 10 in FIG. 1 comprises a first optically-anisotropic layer 11 formed of a liquid-crystal composition, and a second optically-anisotropic layer 12 of a polymer film to support it. Between the optically-anisotropic layers 11 and 12, an alignment film may be disposed that controls the alignment of liquid-crystal molecules in forming the optically-anisotropic layer 11 from a liquid-crystal composition.

FIG. 1 is a schematic view, in which, therefore, the relative thickness of the constitutive layers does not always reflect the relative thickness of the layers in a real optical compensation film. The same shall apply also to FIG. 2 and FIG. 3 to be described hereinunder.

Various materials usable in preparing the optical compensation film of the invention and a method for preparing it are described below.

(First Optically-Anisotropic Layer)

The optical compensation film of the invention comprises a first optically-anisotropic layer, which is characterized in that its Re(550) is from 20 to 40 nm, it does not have a direction in which its retardation is 0 nm, and the direction in which the absolute value of retardation is the smallest is neither in the normal line direction of the layer nor in the in-plane direction thereof. One example of the optically-anisotropic layer having the characteristics as above is an optically-anisotropic layer formed by fixing a liquid-crystal composition in a hybrid alignment state. Re(550) of the first optically-anisotropic layer is preferably from 20 to 40 nm, more preferably from 22 to 38 nm. When Re (550) of the first optically-anisotropic layer is less than 20 nm, then it may detract from the optical compensatory capability of the film which a conventional optical compensation film having the same constitution can originally have. On the other hand, when Re(550) of the layer is more than 40 nm, then the film can not achieve the effect of the invention, or that is, the effect of reducing the yellow color shift in oblique horizontal directions in the white state. In the embodiments where Re(550) of the first optically-anisotropic layer formed of a liquid-crystal composition falls within the above-mentioned range, the film can has the optical compensatory capability that a conventional optical compensation film having the same constitution originally has, and in addition, the film may reduce the above-mentioned yellow color shift.

The liquid-crystal composition for forming the first optically-anisotropic layer is preferably a liquid-crystal composition capable of forming a nematic phase or a smectic phase. Liquid-crystal compounds are generally grouped into rod-shaped and discotic liquid-crystal compounds based on the morphology of the molecules thereof. In the invention, any of those liquid-crystal compounds are usable. For satisfying the characteristics necessary for the first optically-anisotropic layer, the liquid-crystal compound to be used preferably has few wavelength dispersion characteristics of birefringence when the compound has expressed birefringence owing to the alignment of its molecules, or has reversed wavelength dispersion characteristics of birefringence (that is, the birefringence of the compound is smaller at a shorter wavelength).

In the embodiments where a rod-shaped liquid-crystal compound is used and in order that the first optically-anisotropic layer can satisfy the necessary characteristics, preferably, at least two different types of rod-shaped liquid-crystal compounds are used. Preferred examples of the combination include the combination of at least one rod-shaped liquid crystal of the following formula (I) and at least one rod-shaped liquid crystal of the following formula (II):

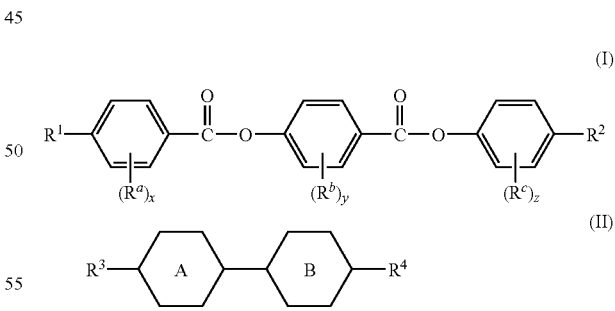

In the formulae, A and B each represent a group of an aromatic or aliphatic hydrocarbon ring or a hetero ring; $R^1$ to $R^4$ each represent a substituted or non-substituted, $C_{1-12}$ (preferably $C_{3-7}$) alkylene group, or $C_{1-12}$ (preferably $C_{3-7}$) alkylene chain-having alkoxy, acyloxy, alkoxycarbonyl or alkoxycarbonyloxy group; $R^a$, $R^b$ and $R^c$ each represent a substituent; x, y and z each indicate an integer of from 1 to 4.

In the formulae, the alkyl chain in $R^1$ to $R^4$ may be either linear or branched. Preferably, it is linear. For curing the composition, $R^1$ to $R^4$ preferably have a terminal polymerizing group; and examples of the polymerizing group include an acryloyl group, a methacryloyl group and an epoxy group.

In formula (I), preferably, x and z are 0 and y is 1; and one $R^b$ is preferably a meta- or ortho-substituent to the oxycarbonyl group or the acyloxy group. $R^b$ is preferably a $C_{1-12}$ alkyl group (e.g., methyl group) or a halogen atom (e.g., fluorine atom).

In formula (II), preferably, A and B each are a phenylene group or a cyclohexylene group; and more preferably, A and B are both phenylene groups, or one of them is a cyclohexylene group and the other is a phenylene group.

Specific examples of the compounds of formula (I) and the compounds of formula (II) are shown below, to which, the invention should not be limited.

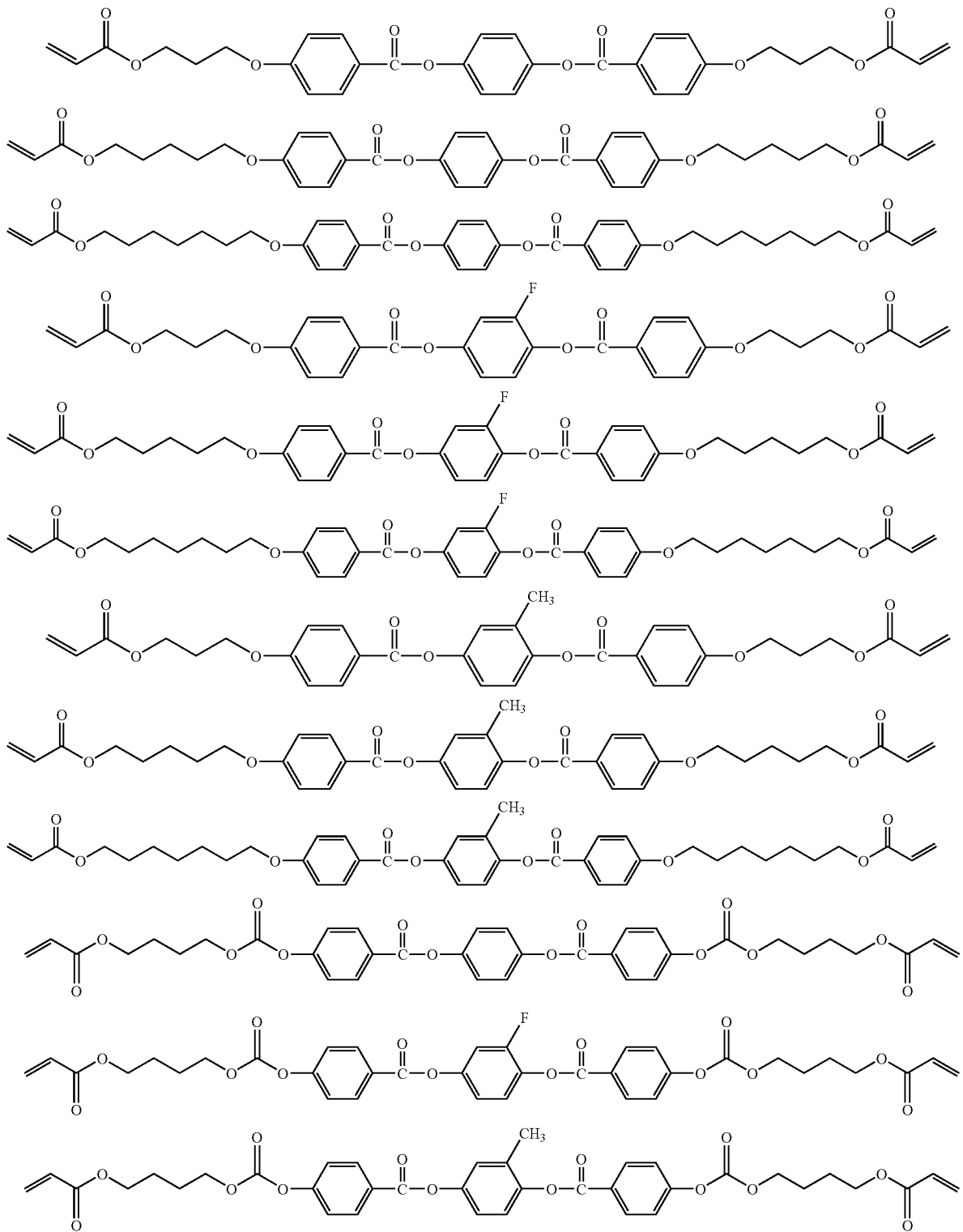

-continued
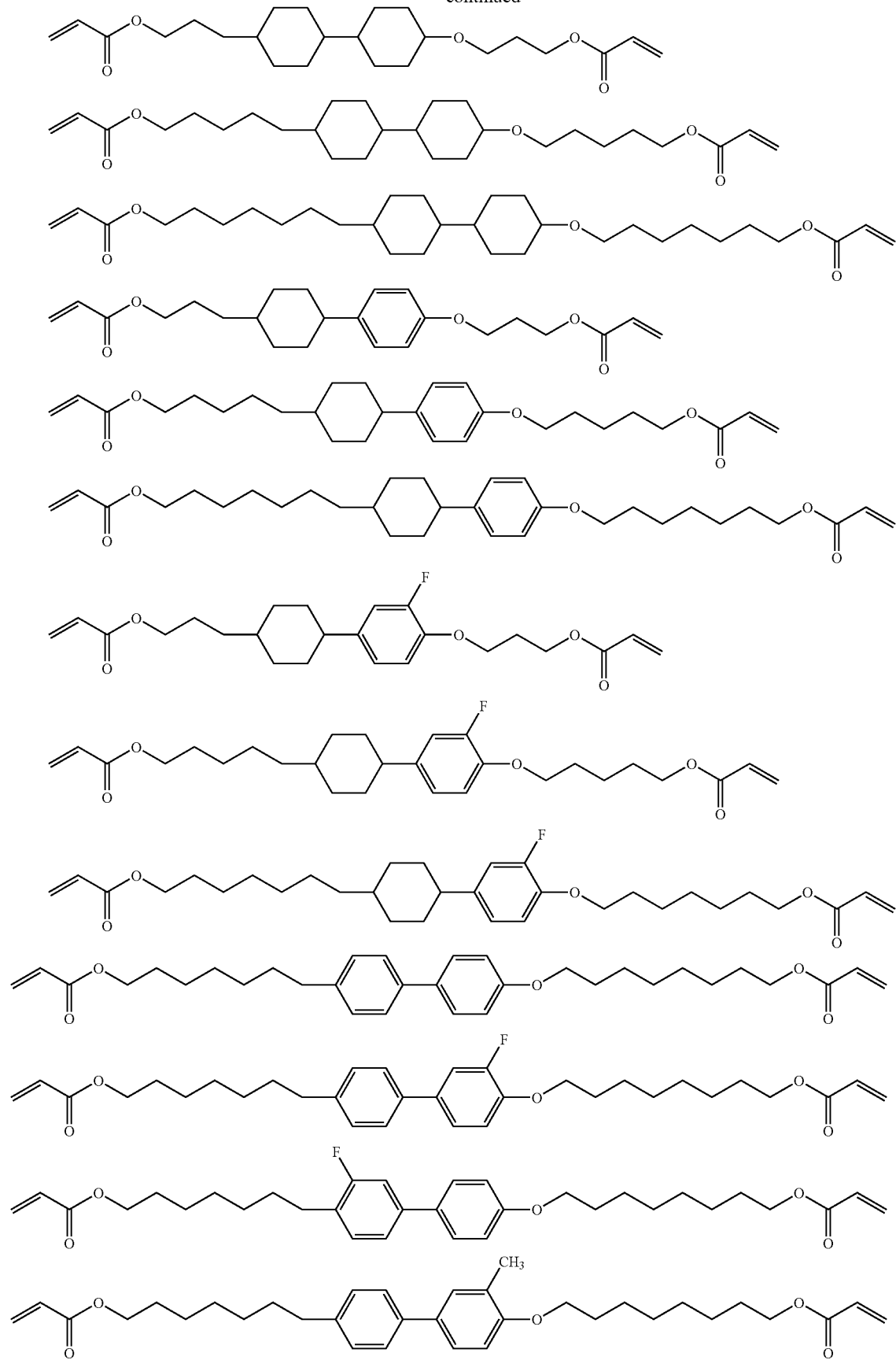

-continued

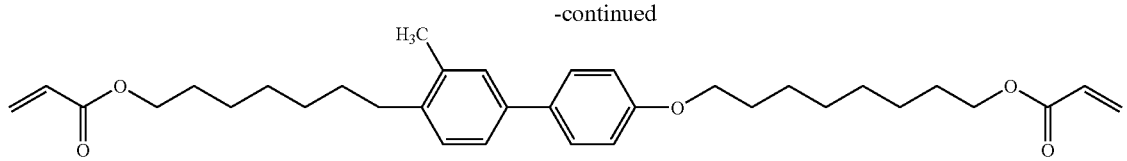

The ratio of the compounds of formulae (I) and (II) is not specifically defined. To satisfy the above-mentioned numerical formula (1), they may be used in an equimolar amount, or any one of them may be a main ingredient and the other may be a side ingredient.

As a discotic liquid crystal compound to be used for preparing the first optically anisotropic layer, the compounds described in JPA No. 2000-76992, [0052], JPA No. 2007-2220, [0040] to [0063], are suitable; and one preferred example of the discotic liquid crystal compound is a compound represented by formula (DI). The compounds of formula (DI) may show high birefringence, which are preferable. Among the compound of formula (DI), the compounds exhibiting a discotic liquid crystallinity are preferable, and the compounds having a discotic-nematic phase are more preferable.

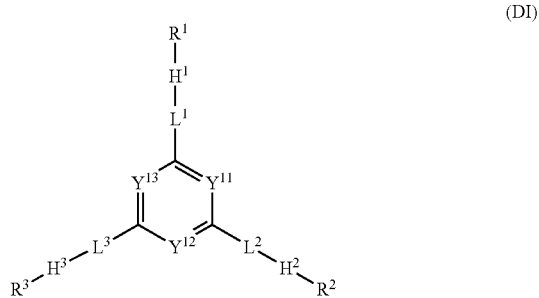

(DI)

In formula (DI), $Y^{11}$, $Y^{12}$ and $Y^{13}$ each independently represent a methine group or a nitrogen atom; $L^1$, $L^2$ and $L^3$ each independently represent a single bond or a bivalent linking group; $H^1$, $H^2$ and $H^3$ each independently represent formula (DI-A) or (DI-B) shown below; and $R^1$, $R^2$ and $R^3$ each independently represent formula (DI-R) shown below.

In formula (DI), $Y^{11}$, $Y^{12}$ and $Y^{13}$ each independently represent a methine group or a nitrogen atom. When each of $Y^{11}$, $Y^{12}$ and $Y^{13}$ each is a methine group, the hydrogen atom of the methine group may be substituted with a substituent. Examples of the substituent of the methine group include an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom, and a cyano group. Of those, preferred are an alkyl group, an alkoxy group, an alkoxycarbonyl group, an acyloxy group, a halogen atom and a cyano group; more preferred are an alkyl group having from 1 to 12 carbon atoms (the term "carbon atoms" means hydrocarbons in a substituent, and the terms appearing in the description of the substituent of the discotic liquid crystal compound have the same meaning), an alkoxy group having from 1 to 12 carbon atoms, an alkoxycarbonyl group having from 2 to 12 carbon atoms, an acyloxy group having from 2 to 12 carbon atoms, a halogen atom and cyano.

Preferably, $Y^{11}$, $Y^{12}$ and $Y^{13}$ are all methine groups, more preferably non-substituted methine groups.

In formula (DI), $L^1$, $L^2$ and $L^3$ each independently represent a single bond or a bivalent linking group. The bivalent linking group is preferably selected from —O—, —S—, —C(=O)—, —NR$^7$—, —CH=CH—, —C≡C—, a bivalent cyclic group, and their combinations. $R^7$ represents an alkyl group having from 1 to 7 carbon atoms, or a hydrogen atom, preferably an alkyl group having from 1 to 4 carbon atoms, or a hydrogen atom, more preferably a methyl, an ethyl or a hydrogen atom, even more preferably a hydrogen atom.

The bivalent cyclic group for $L^1$, $L^2$ and $L^3$ is preferably a 5-membered, 6-membered or 7-membered group, more preferably a 5-membered or 6-membered group, even more preferably a 6-membered group. The ring in the cyclic group may be a condensed ring. However, a monocyclic ring is preferred to a condensed ring for it. The ring in the cyclic ring may be any of an aromatic ring, an aliphatic ring, or a hetero ring. Examples of the aromatic ring are a benzene ring and a naphthalene ring. An example of the aliphatic ring is a cyclohexane ring. Examples of the hetero ring are a pyridine ring and a pyrimidine ring. Preferably, the cyclic group contains an aromatic ring or a hetero ring.

Of the bivalent cyclic group, the benzene ring-having cyclic group is preferably a 1,4-phenylene group. The naphthalene ring-having cyclic group is preferably a naphthalene-1,5-diyl group or a naphthalene-2,6-diyl group. The cyclohexane ring-having cyclic group is preferably a 1,4-cyclohexylene-diyl group. The pyridine ring-having cyclic group is preferably a pyridine-2,5-diyl group. The pyrimidine ring-having cyclic group is preferably a pyrimidin-2,5-diyl group.

The bivalent cyclic group for $L^1$, $L^2$ and $L^3$ may have a substituent. Examples of the substituent are a halogen atom, a cyano group, a nitro group, an alkyl group having from 1 to 16 carbon atoms, an alkenyl group having from 2 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms.

In the formula, $L^1$, $L^2$ and $L^3$ are preferably a single bond, *—O—CO—, *—CO—O—, *—CH=CH—, *—C≡C—, *-"bivalent cyclic group"-, *—O—CO—"bivalent cyclic group"-, *—CO—O-"bivalent cyclic group"-, *—CH=CH-"bivalent cyclic group"-, *—C≡C-"bivalent cyclic group"-, *-"bivalent cyclic group"-O—CO—, *-"bivalent cyclic group"-CO—O—, *-"bivalent cyclic group"-CH=CH—, or *-"bivalent cyclic group"-C≡C—. More preferably, they are a single bond, *—CH=CH—, *—C≡C—, *—CH=CH-"bivalent cyclic group"- or *—C≡C-"bivalent cyclic group"-, even more preferably a single bond. In the examples, "*" indicates the position at which the group bonds to the 6-membered ring of formula (DI) that contains $Y^{11}$, $Y^{12}$ and $Y^{13}$.

In formula (DI), $H^1$, $H^2$ and $H^3$ each independently represent the following formula (DI-A) or (DI-B):

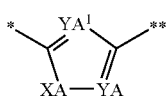

(DI-A)

In formula (DI-A), $YA^1$ and $YA^2$ each independently represent a methine group or a nitrogen atom. Preferably, at least one of $YA^1$ and $YA^2$ is a nitrogen atom, more preferably they are both nitrogen atoms. XA represents an oxygen atom, a sulfur atom, a methylene group or an imino group. XA is preferably an oxygen atom. It is to be noted that * indicates the position at which the formula bonds to any of $L^1$ to $L^3$; and ** indicates the position at which the formula bonds to any of $R^1$ to $R^3$, and that "imino" means —NH— (or the group in which H is substituted with any substituent).

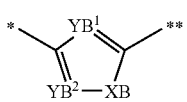

(DI-B)

In formula (DI-B), $YB^1$ and $YB^2$ each independently represent a methine group or a nitrogen atom. Preferably, at least one of $YB^1$ and $YB^2$ is a nitrogen atom, more preferably they are both nitrogen atoms. XB represents an oxygen atom, a sulfur atom, a methylene group or an imino group. XB is preferably an oxygen atom. * indicates the position at which the formula bonds to any of $L^1$ to $L^3$; and ** indicates the position at which the formula bonds to any of $R^1$ to $R^3$.

In the formula, $R^1$, $R^2$ and $R^3$ each independently represent the following formula (DI-R):

(DI-R)

In formula (DI-R), * indicates the position at which the formula bonds to $H^1$, $H^2$ or $H^3$ in formula (DI). In the formula, $L^{21}$ represents a single bond or a bivalent linking group. When $L^{21}$ is a bivalent linking group, it is preferably selected from a group consisting of —O—, —S—, —C(=O)—, —$NR^7$, —CH=CH—, —C≡C—, and their combination. $R^7$ represents an alkyl group having from 1 to 7 carbon atoms, or a hydrogen atom, preferably an alkyl group having from 1 to 4 carbon atoms, or a hydrogen atom, more preferably a methyl group, an ethyl group or a hydrogen atom, even more preferably a hydrogen atom.

In the formula, $L^{21}$ is preferably a single bond, *—O—CO—, *—CO—O—, *—CH=CH— or *—C≡C— (in which *** indicates the left side of $L^{21}$ in formula (DI-R)). More preferably it is a single bond.

In the formula, $F^1$ represents a bivalent linking group having at least one cyclic structure. The cyclic structure is preferably a 5-membered ring, a 6-membered ring, or a 7-membered ring, more preferably a 5-membered ring or a 6-membered ring, even more preferably a 6-membered ring. The cyclic structure may be a condensed ring. However, a monocyclic ring is preferred to a condensed ring for it. The ring in the cyclic ring may be any of an aromatic ring, an aliphatic ring, or a hetero ring. Examples of the aromatic ring are a benzene ring, a naphthalene ring, an anthracene ring, a phenanthrene ring. An example of the aliphatic ring is a cyclohexane ring. Examples of the hetero ring are a pyridine ring and a pyrimidine ring.

Preferred examples of $F^1$ include benzene ring-having groups such as a 1,4-phenylene group and 1,3-phenylene group; naphthalene ring-having groups such as a naphthalene-1,4-diyl group, a naphthalene-1,5-diyl group, a naphthalene-1,6-diyl group, a naphthalene-2,5-diyl group, a naphthalene-2,6-diyl group and a naphthalene-2,7-diyl group; cyclohexane ring-having groups such as a 1,4-cyclohexylene group; pyridine ring-having groups such as a pyridine-2,5-diyl group; and pyrimidine ring-having groups such as a pyrimidin-2,5-diyl group. $F^1$ more preferably represents a 1,4-phenylene group, a 1,3-phenylend group, a naphthalene-2,6-diyl group or a 1,4-cyclohexylene group.

In the formula, $F^1$ may have at least one substituent. Examples of the substituent include a halogen atom (e.g., fluorine atom, chlorine atom, bromine atom, iodine atom), a cyano group, a nitro group, an alkyl group having from 1 to 16 carbon atoms, an alkenyl group having from 1 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Preferable examples of the substituent include a halogen atom, a cyano group, an alkyl group having from 1 to 6 carbon atoms, and a halogen atom-substituted alkyl group having from 1 to 6 carbon atoms; more preferable examples include a halogen atom, an alkyl group having from 1 to 4 carbon atoms, and a halogen atom-substituted alkyl group having from 1 to 4 carbon atoms; even more preferable examples include a halogen atom, an alkyl group having from 1 to 3 carbon atoms, and a trifluoromethyl group.

In the formula, n1 indicates an integer of from 1 to 4. n1 is preferably an integer of from 1 to 3, and more preferably 1 or 2. Where n1 is 0, $L^{22}$ in formula (DI-R) directly links to any of $H^1$ to $H^3$. Where n1 is 2 or more, plural of -$L^{21}$-$F^1$ may be same of different from each other.

In the formula, $L^{22}$ represents —O—, —O—CO—, —CO—O—, —O—CO—O—, —S—, —NH—, —SO$_2$—, —CH$_2$—, —CH=CH— or —C≡C—, preferably —O—, —O—CO—, —CO—O—, —O—CO—O—, —CH$_2$—, —CH=CH— or —C≡C—, and more preferably —O—, —O—CO—, —CO—O—, —O—CO—O— or —CH$_2$—.

Among the above mentioned groups, the groups having one or more hydrogen atoms, the hydrogen atom(s) may be replaced with one or more substituents. Examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

In the formula, $L^{23}$ represents a bivalent linking group selected from —O—, —S—, —C(=O)—, —SO$_2$—, —NH—, —CH$_2$—, —CH=CH— and —C≡C—, and a group formed by linking two or more of these. The hydrogen atom in —NH—, —CH$_2$— and —CH=CH— may be substituted with any other substituent. L$^{23}$ preferably has from 1 to 20 carbon atoms, more preferably from 2 to 14 carbon atoms. Preferably, L$^{23}$ has from 1 to 16 (—CH$_2$—)'s, more preferably from 2 to 12 (—CH$_2$—)'s.

In the formula, Q$^1$ represents a polymerizing group or a hydrogen atom. Q$^1$ is preferably a polymerizing group. The polymerization for the group is preferably addition polymerization (including ring-cleavage polymerization) or polycondensation. In other words, the polymerizing group preferably has a functional group that enables addition polymerization or polycondensation. Examples of the polymerizing group are shown below.

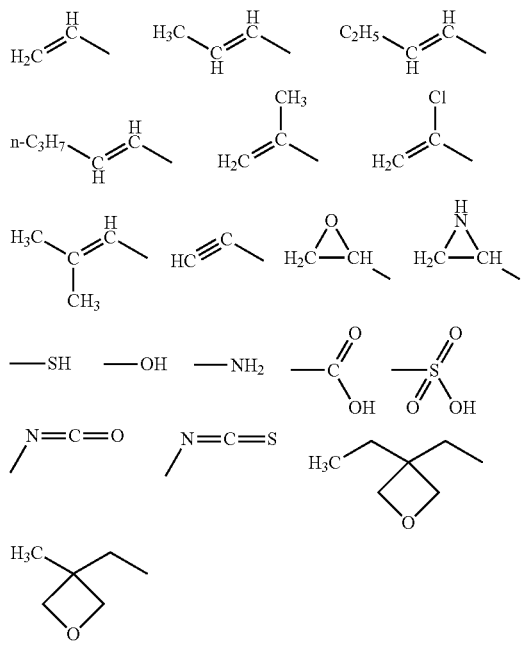

More preferably, the polymerizing group is addition-polymerizing functional group. The polymerizing group of the type is preferably a polymerizing ethylenic unsaturated group or a ring-cleavage polymerizing group.

Examples of the polymerizing ethylenic unsaturated group are the following (M-1) to (M-6):

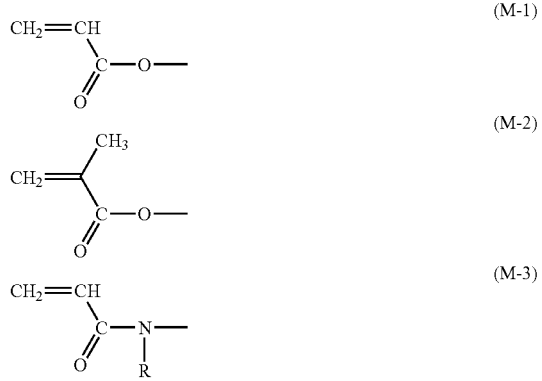

In formulae (M-3) and (M-4), R represents a hydrogen atom or an alkyl group. R is preferably a hydrogen atom or a methyl group. Of formulae (M-1) to (M-6), preferred are formulae (M-1) and (M-2), and more preferred is formula (M-1).

The ring-cleavage polymerizing group is preferably a cyclic ether group, more preferably an epoxy group or an oxetanyl group, most preferably an epoxy group.

A liquid-crystal compound of formula (DII) or formula (DIII) sown below is more preferred for the liquid-crystal compound for use in the invention.

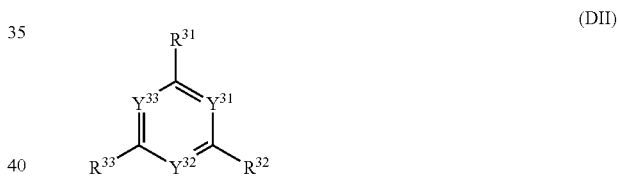

(DII)

In formula (DII), Y$^{31}$, Y$^{32}$ and Y$^{33}$ each independently represent a methine group or a nitrogen atom; and R$^{31}$, R$^{32}$ and R$^{33}$ each independently represent formula (DII-R) shown below.

In the formula, Y$^{31}$, Y$^{32}$ and Y$^{33}$ have the same meaning as that of Y$^{11}$, Y$^{12}$ and Y$^{13}$ in formula (DI), and their preferred range is also the same as therein.

In the formula, R$^{31}$, R$^{32}$ and R$^{33}$ each independently represent the following formula (DII-R):

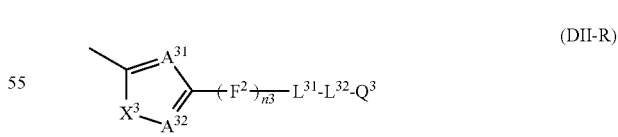

(DII-R)

In formula (DII-R), A$^{31}$ and A$^{32}$ each independently represent a methine group or a nitrogen atom. Preferably, at least one of A$^{31}$ and A$^{32}$ is a nitrogen atom; most preferably the two are both nitrogen atoms.

In the formula, X$^3$ represents an oxygen atom, a sulfur atom, a methylene group or an imino group. Preferably, X$^3$ is an oxygen atom.

In formula (DII-R), F$^2$ represents a bivalent cyclic linking group having a 6-membered cyclic structure. The 6-membered ring in $F^2$ may be a condensed ring. However, a monocyclic ring is preferred to a condensed ring for it. The 6-membered ring in $F^2$ may be any of an aromatic ring, an aliphatic ring, or a hetero ring.

Examples of the aromatic ring are a benzene ring, a naphthalene ring, an anthracene ring and a phenanthrene ring. An example of the aliphatic ring is a cyclohexane ring. Examples of the hetero ring are a pyridine ring and a pyrimidine ring.

Preferred examples of the bivalent cyclic group include benzene ring-having groups such as a 1,4-phenylene group and a 1,3-phenylene group; naphthalene ring-having groups such as a naphthalene-1,4-diyl group, a naphthalene-1,5-diyl group, a naphthalene-2,5-diyl group, a naphthalene-2,6-diyl group and a naphthalene-2,7-diyl group; cyclohexane ring-having groups such as a 1,4-cyclohexylene group; pyridine ring-having groups such as a pyridine-2,5-diyl group; and pyrimidine ring-having groups such as a pyrimidin-2,5-diyl group. More preferably, the bivalent cyclic group represents a 1,4-phenylene group, a 1,3-phenylene group, a naphthalene-2,6-diyl group or a 1,4-cyclohexylene group.

In the formula, $F^2$ may have at lease one substituent. Examples of the substituent are a halogen atom (e.g., fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. The substituent of the bivalent cyclic group is preferably a halogen atom, a cyano group, an alkyl group having from 1 to 6 carbon atoms, a halogen atom-substituted alkyl group having from 1 to 6 carbon atoms, more preferably a halogen atom, an alkyl group having from 1 to 4 carbon atoms, a halogen atom-substituted alkyl group having from 1 to 4 carbon atoms, even more preferably a halogen atom, an alkyl group having from 1 to 3 carbon atoms, or a trifluoromethyl group.

In the formula, n3 indicates an integer of from 1 to 3. n3 is preferably 1 or 2. when n3 is more than 2, plural $F^2$ may be same or different from each other.

In the formula, $L^{31}$ represents —O—, —O—CO—, —CO—O—, —O—CO—O—, —S—, —N(R)—, —SO$_2$—, —CH$_2$—, —CH=CH— or —C≡C—, and has the same meaning as that of $L^{22}$ in formula (DI-R). The preferred range of $L^{31}$ may be the same as that of $L^{22}$ in formula (DI-R).

In the formula, $L^{32}$ represents a bivalent linking group selected from —O—, —S—, —C(=O)—, —SO$_2$—, —NH—, —CH$_2$—, —CH=CH— and —C≡C—, and a group formed by linking two or more of these, and when the group has a hydrogen atom, the hydrogen atom may be substituted with a substituent, and has the same meaning as that of $L^{23}$ in formula (DI-R). The preferred range of $L^{32}$ may be the same as that of $L^{23}$ in formula (DI-R).

In the formula, $Q^3$ represents a polymerizable group or a hydrogen atom, and has the same meaning as that of $Q^1$ in formula (DI-R).

Compounds of formula (DIII) will be described in detail.

(DIII)

In formula (DIII), $Y^{41}$, $Y^{42}$ and $Y^{43}$ each independently represent a methine group or a nitrogen atom. When $Y^{41}$, $Y^{42}$ and $Y^{43}$ each are a methine group, the hydrogen atom of the methine group may be substituted with a substituent. Preferred examples of the substituent that the methine group may have are an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom, and a cyano group. Of those, more preferred are an alkyl group, an alkoxy group, an alkoxycarbonyl group, an acyloxy group, a halogen atom and a cyano group; even more preferred are an alkyl group having from 1 to 12 carbon atoms, an alkoxy group having from 1 to 12 carbon atoms, an alkoxycarbonyl group having from 2 to 12 carbon atoms, an acyloxy group having from 2 to 12 carbon atoms, a halogen atom and a cyano group.

Preferably, $Y^{41}$, $Y^{42}$ and $Y^{43}$ are all methine groups, more preferably non-substituted methine groups.

In the formula, $R^{41}$, $R^{42}$ and $R^{43}$ each independently represent formula (DIII-A), (DIII-B) or (DIII-C) shown below.

When an optically anisotropic layer having a small wavelength dispersion is prepared, the compound in which $R^{41}$, $R^{42}$ and $R^{43}$ are represented by formula (DIII-A) or (DIII-C), more preferably formula (DIII-A), is preferably used.

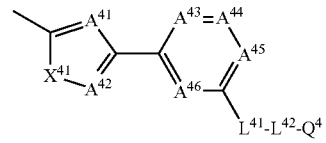

(DIII-A)

In formula (DIII-A), $A^{41}$, $A^{42}$, $A^{43}$, $A^{44}$, $A^{45}$ and $A^{46}$ each independently represent a methine group or a nitrogen atom. Preferably, at least one of $A^{41}$ and $A^{42}$ is a nitrogen atom; more preferably the two are both nitrogen atoms. Preferably, at least three of $A^{43}$, $A^{44}$, $A^{45}$ and $A^{46}$ are methine groups; more preferably, all of them are methine groups. When $A^{43}$, $A^{44}$, $A^{45}$ and $A^{46}$ are methine groups, the hydrogen atom of the methine group may be substituted with a substituent. Examples of the substituent that the methine group may have are a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

In the formula, $X^{41}$ represents an oxygen atom, a sulfur atom, a methylene group or an imino group, but is preferably an oxygen atom.

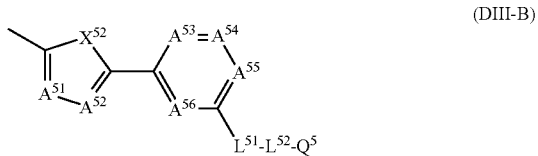

(DIII-B)

In formula (DIII-B), $A^{51}$, $A^{52}$, $A^{53}$, $A^{54}$, $A^{55}$ and $A^{56}$ each independently represent a methine group or a nitrogen atom. Preferably, at least one of $A^{51}$ and $A^{52}$ is a nitrogen atom; more preferably the two are both nitrogen atoms. Preferably, at least three of $A^{53}$, $A^{54}$, $A^{55}$ and $A^{56}$ are methine groups; more preferably, all of them are methine groups. When $A^{53}$, $A^{54}$, $A^{55}$ and $A^{56}$ are methine groups, the hydrogen atom of the methine group may be substituted with a substituent. Examples of the substituent that the methine group may have are a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

In the formula, $X^{52}$ represents an oxygen atom, a sulfur atom, a methylene group or an imino group, but is preferably an oxygen atom.

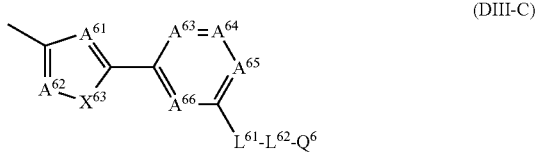

(DIII-C)

In formula (DIII-C), $A^{61}$, $A^{62}$, $A^{63}$, $A^{64}$, $A^{65}$ and $A^{66}$ each independently represent a methine group or a nitrogen atom. Preferably, at least one of $A^{61}$ and $A^{62}$ is a nitrogen atom; more preferably the two are both nitrogen atoms. Preferably, at least three of $A^{63}$, $A^{64}$, $A^{65}$ and $A^{66}$ are methine groups; more preferably, all of them are methine groups. When $A^{63}$, $A^{64}$, $A^{65}$ and $A^{66}$ are methine groups, the hydrogen atom of the methine group may be substituted with a substituent. Examples of the substituent that the methine group may have are a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

In the formula, $X^{63}$ represents an oxygen atom, a sulfur atom, a methylene group or an imino group, but is preferably an oxygen atom.

$L^{41}$ in formula (DIII-A), $L^{51}$ in formula (DIII-B) and $L^{61}$ in formula (DIII-C) each independently represent —O—, —O—CO—, —CO—O—, —O—CO—O—, —S—, —NH—, —SO$_2$—, —CH$_2$—, —CH=CH— or —C≡C—; preferably —O—, —O—CO—, —CO—O—, —O—CO—O—, —CH$_2$—, —CH=CH— or —C≡C—; more preferably —O—, —O—CO—, —CO—O—, —O—CO—O— or —CH$_2$—. When above group has a hydrogen atom, then the hydrogen atom may be substituted with a substituent.

Preferred examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

$L^{42}$ in formula (DIII-A), $L^{52}$ in formula (DIII-B) and $L^{62}$ in formula (DIII-C) each independently represent a bivalent linking group selected from —O—, —S—, —C(=O)—, —SO$_2$—, —NH—, —CH$_2$—, —CH=CH— and —C≡C—, and a group formed by linking two or more of these. The hydrogen atom in —NH—, —CH$_2$— and —CH=CH— may be substituted with a substituent. Preferred examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

Preferably, $L^{42}$, $L^{52}$ and $L^{62}$ each independently represent a bivalent linking group selected from —O—, —C(=O)—, —CH$_2$—, —CH=CH— and —C≡C—, and a group formed by linking two or more of these. Preferably, $L^{42}$, $L^{52}$ and $L^{62}$ each independently have from 1 to 20 carbon atoms, more preferably from 2 to 14 carbon atoms. Preferably, $L^{42}$, $L^{52}$ and $L^{62}$ each independently have from 1 to 16 (—CH$_2$—)'s, more preferably from 2 to 12 (—CH$_2$—)'s.

$Q^4$ in formula (DIII-A), $Q^5$ in formula (DIII-B) and $Q^6$ in formula (DIII-C) each independently represent a polymerizing group or a hydrogen atom. Their preferred ranges are the same as that of $Q^1$ in formula (DI-R).

Specific examples of the compounds of formulae (DI), (DII) and (DIII) include, but are not limited to, those shown below.

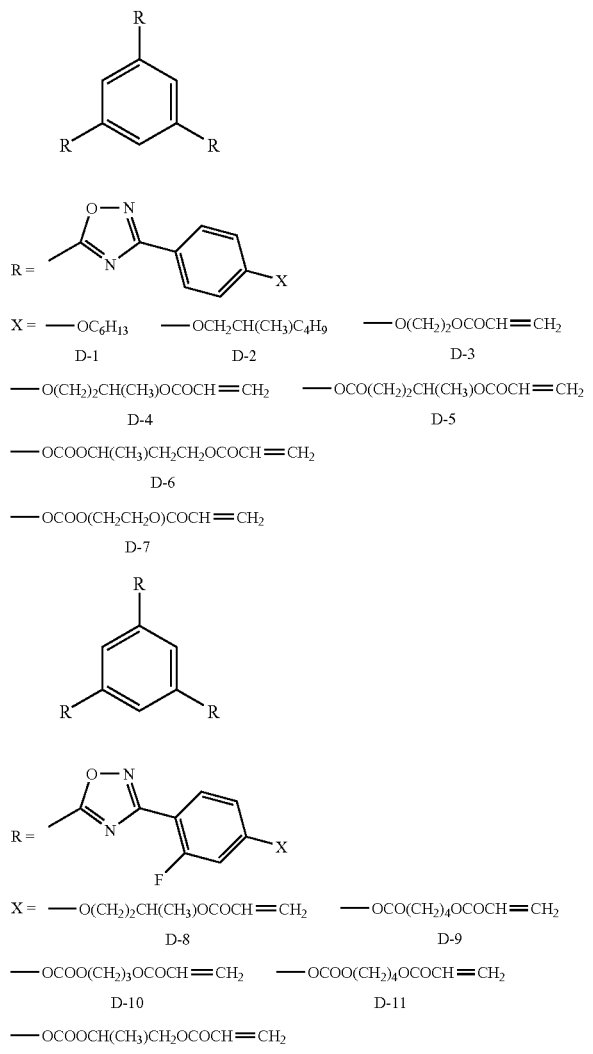
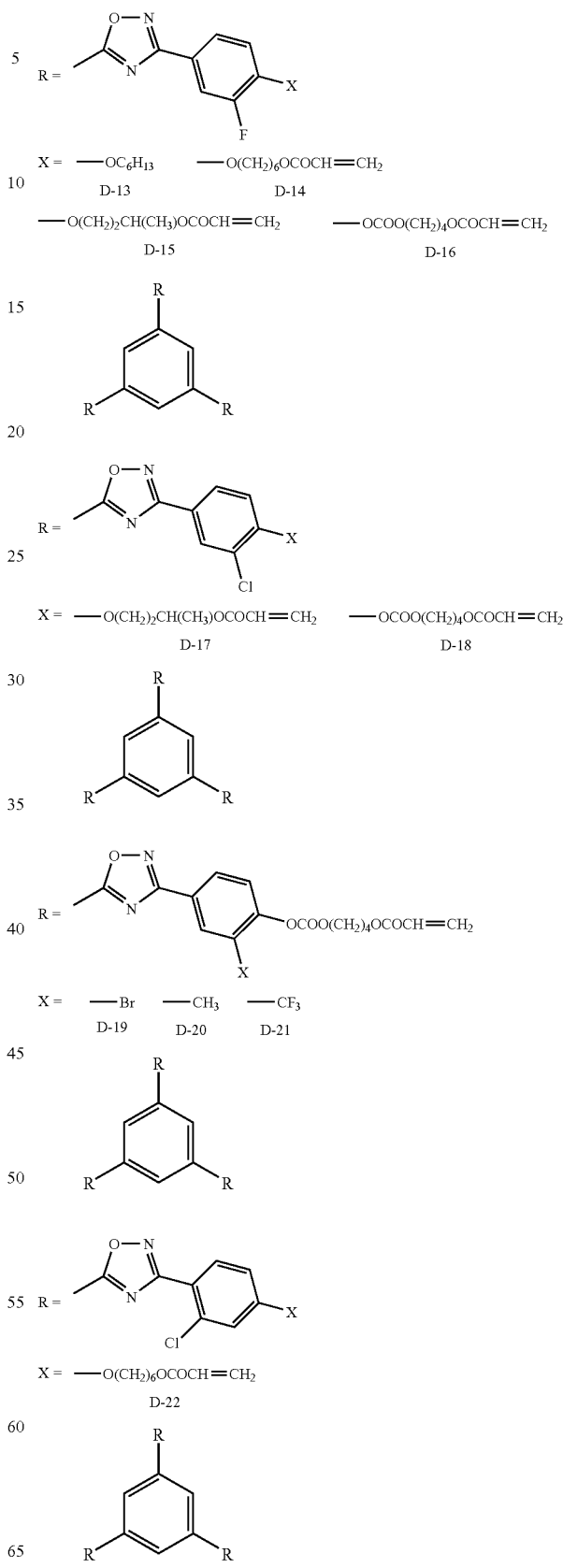

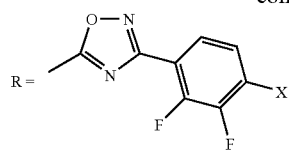
X= —OCOO(CH$_2$)$_4$OCOCH=CH$_2$
D-23
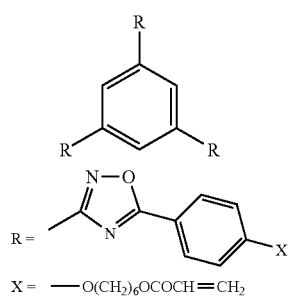
X= —O(CH$_2$)$_6$OCOCH=CH$_2$
D-24
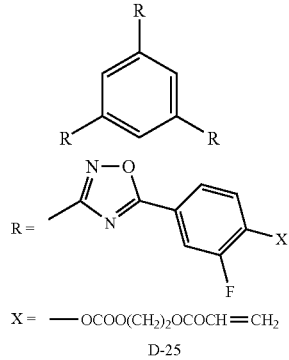
X= —OCOO(CH$_2$)$_2$OCOCH=CH$_2$
D-25
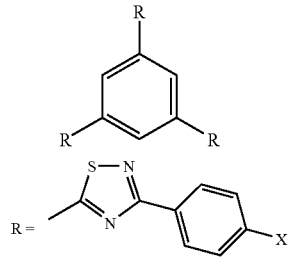
X= —O(CH$_2$)$_6$OCOCH=CH$_2$
D-26
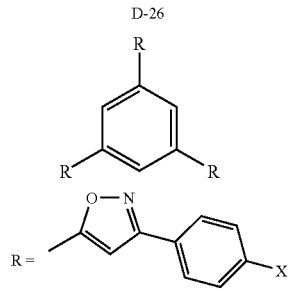
X= —OCO(CH$_2$)$_3$OCOCH=CH$_2$
D-27
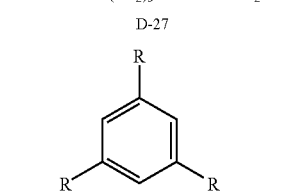
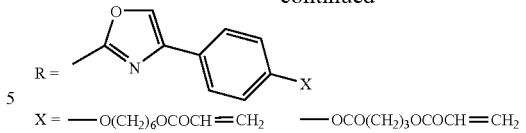
X= —O(CH$_2$)$_6$OCOCH=CH$_2$      —OCO(CH$_2$)$_3$OCOCH=CH$_2$
D-28                                 D-29
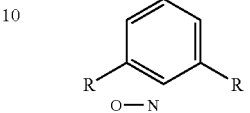
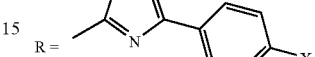
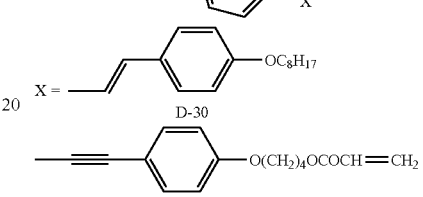
X= 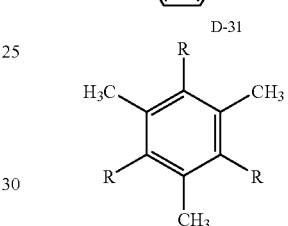
D-30
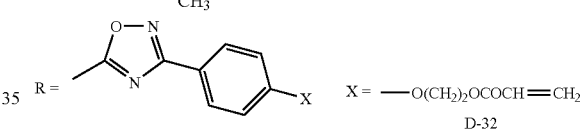
D-31
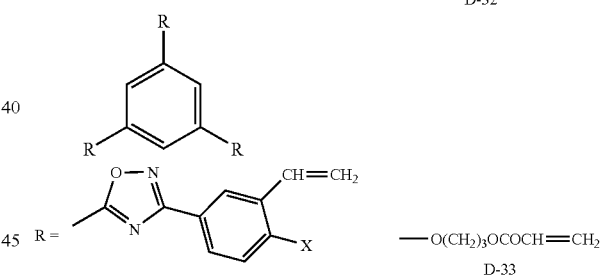
X= —O(CH$_2$)$_2$OCOCH=CH$_2$
D-32
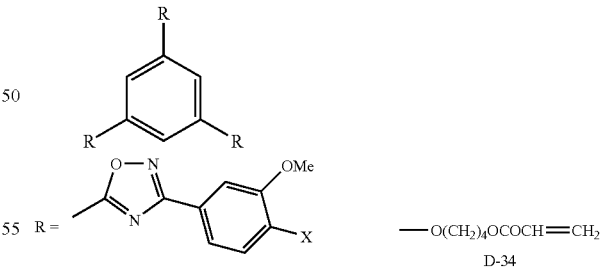
—O(CH$_2$)$_3$OCOCH=CH$_2$
D-33
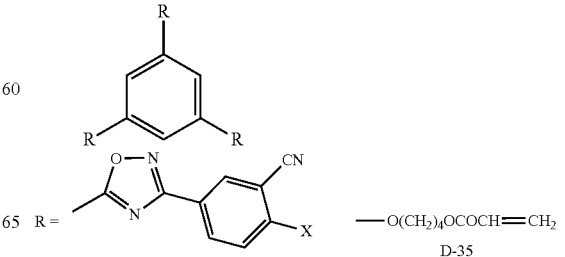
—O(CH$_2$)$_4$OCOCH=CH$_2$
D-34
—O(CH$_2$)$_4$OCOCH=CH$_2$
D-35

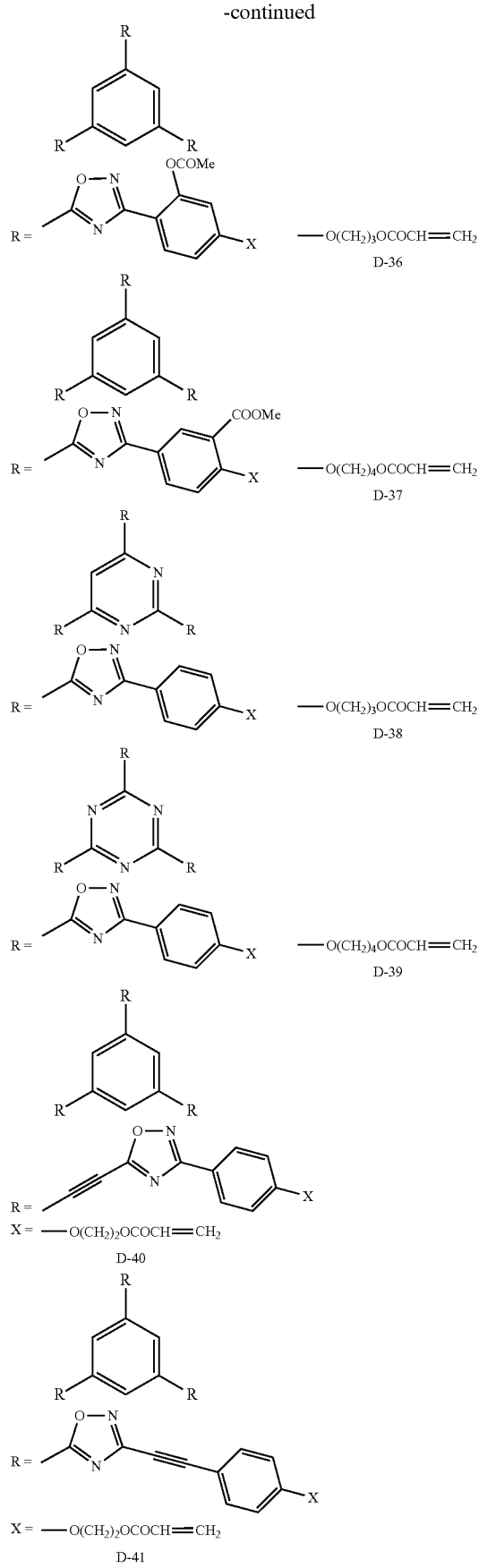
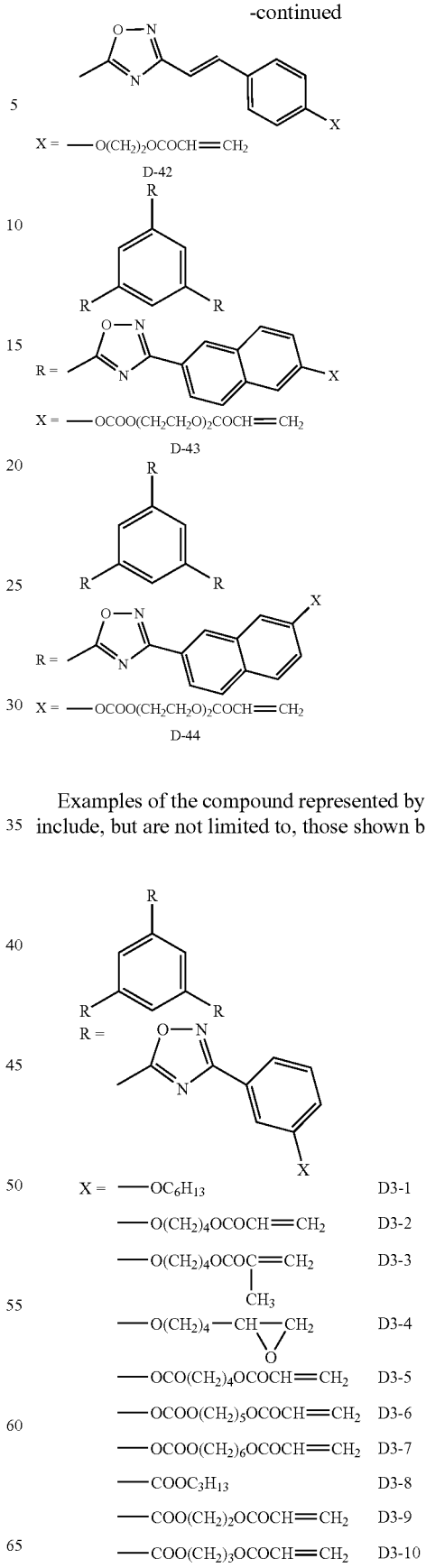
Examples of the compound represented by formula (DIII) include, but are not limited to, those shown below.

—COO(CH₂)₄OCOCH=CH₂  D3-11

—COO(CH₂)₅OCOCH=CH₂  D3-12

—COO(CH₂)₆OCOCH=CH₂  D3-13

—COO(CH₂)₇OCOCH=CH₂  D3-14

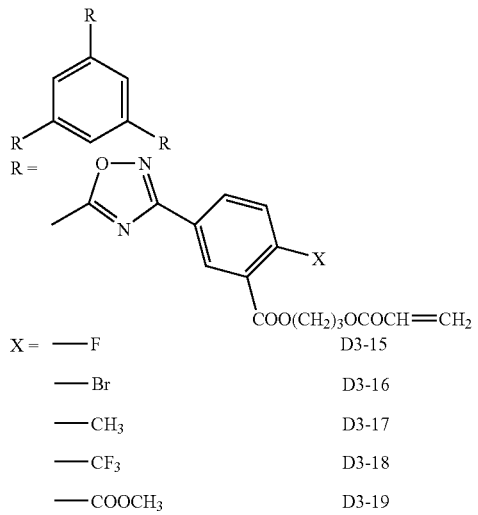

X = —F  D3-15

—Br  D3-16

—CH₃  D3-17

—CF₃  D3-18

—COOCH₃  D3-19

The compounds of the formulae (DI), (DII) and (DII) for used in the invention may be produced according to any method.

According to the invention, as the liquid-crystal compound for used in the invention, only one kind of the compounds of the formulae (DI), (DII) and (DII), or two or more thereof may be used.

Preferred examples of the discotic liquid crystal compound include the compounds described in JPA No. 2005-301206.

Examples of discotic liquid-crystalline compounds include benzene derivatives described in "Mol. Cryst.", vol. 71, page 111 (1981), C. Destrade et al; truxane derivatives described in "Mol. Cryst.", vol. 122, page 141 (1985), C. Destrade et al. and "Physics lett. A", vol. 78, page 82 (1990); cyclohexane derivatives described in "Angew. Chem.", vol. 96, page 70 (1984), B. Kohne et al.; and macrocycles based aza-crowns or phenyl acetylenes described in "J. Chem. Commun.", page 1794 (1985), M. Lehn et al. and "J. Am. Chem. Soc.", vol. 116, page 2,655 (1994), J. Zhang et al. The polymerization of discotic liquid-crystalline compounds is described in JPA No. hei 8-27284.

In order to fix the discotic liquid crystalline molecule by a polymerization, a polymerizable group has to be bonded as a substituent group to a disk-shaped core of the discotic liquid crystalline molecule. In a preferred compound, the disk-shaped core and the polymerizable group are preferably bonded through a linking group, whereby the aligned state can be maintained in the polymerization reaction. Preferred examples of the discotic liquid crystalline compound having a polymerizable group include the group represented by formula (A) below.

D(-L-P)ₙ  Formula (A)

In the formula, D is a disk-shaped core, L is a divalent liking group, P is a polymerizable group, and n is an integer from 4 to 12.

Examples of the disk-shaped core are shown below. In each of the examples, LP or PL means the combination of the divalent linking group (L) and the polymerizable group (P).

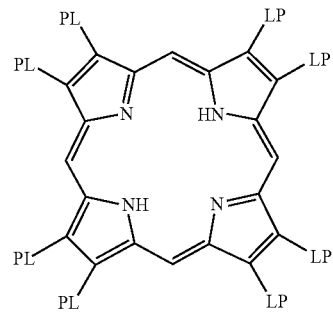  (D1)

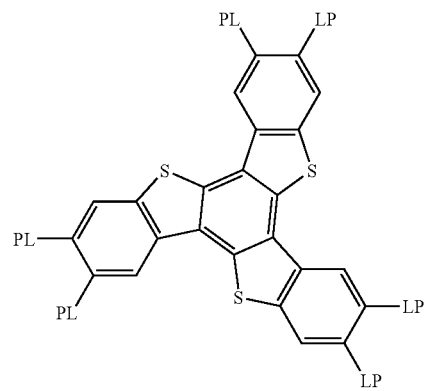  (D2)

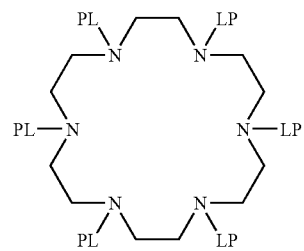  (D3)

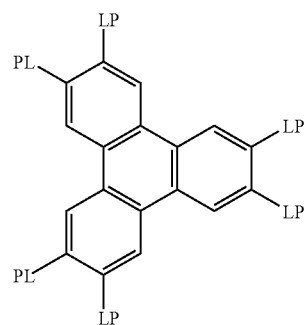  (D4)

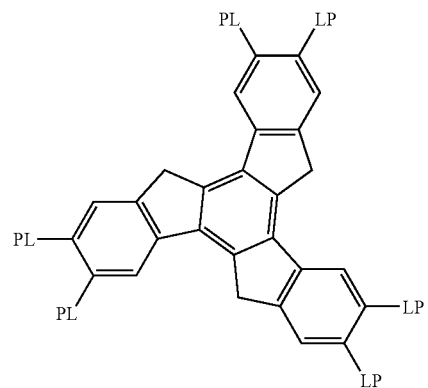  (D5)

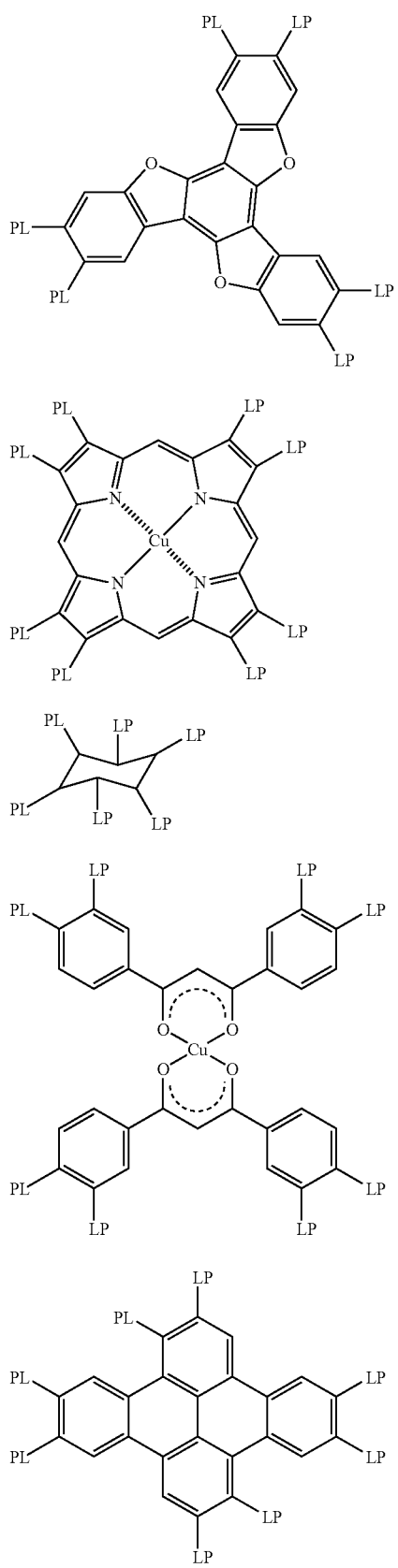
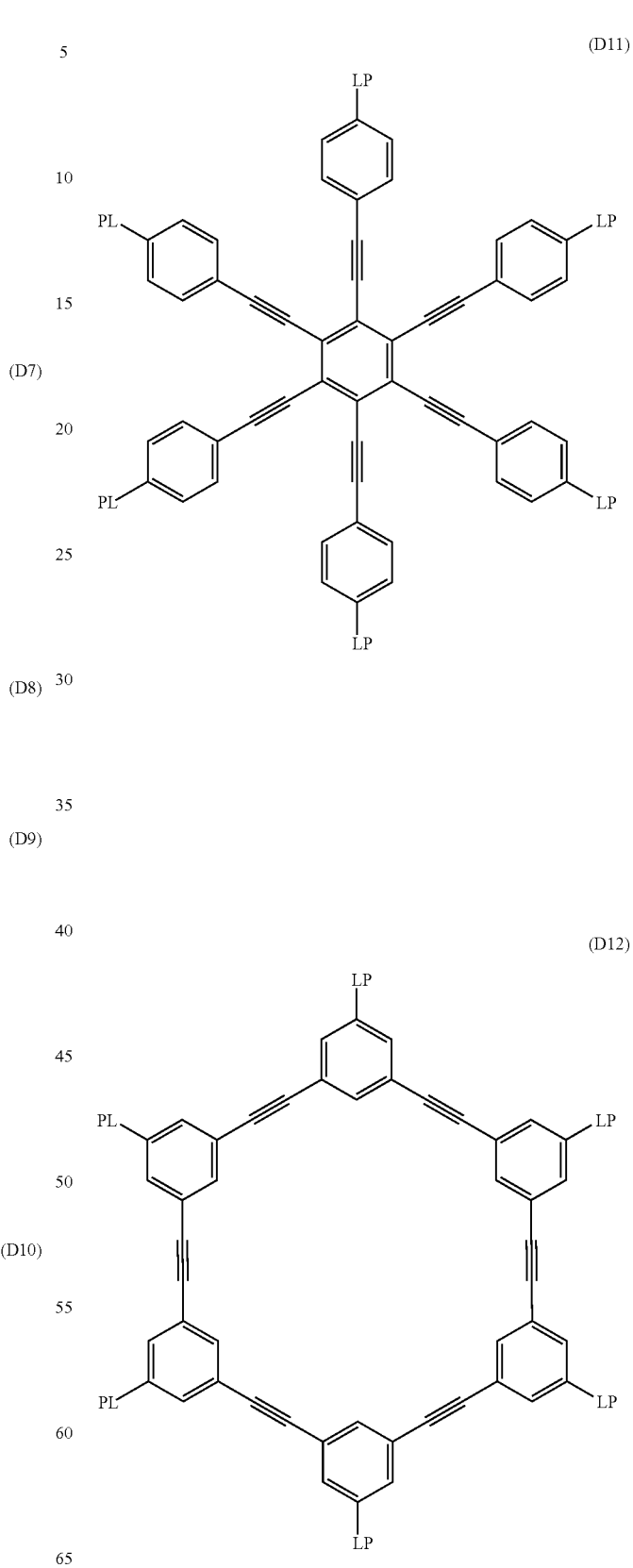

-continued

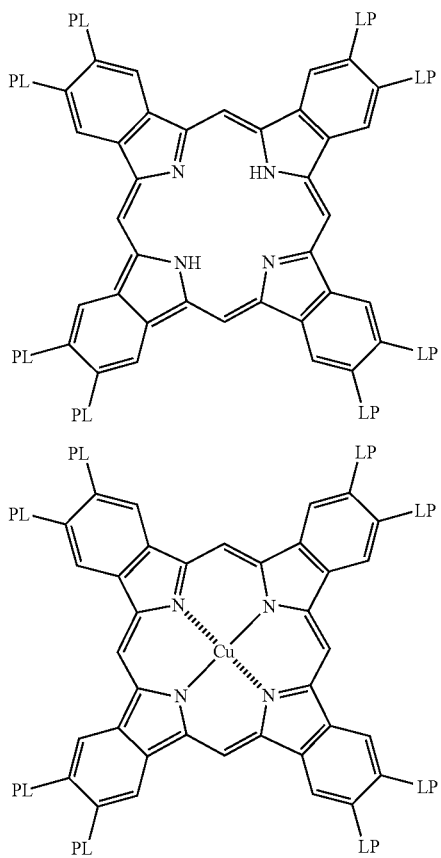

(D13)

(D14)

(D15)

In formula (A), the divalent linking group (L) is preferably any one of those selected from the group consisting of alkylene group, alkenylene group, arylene group, —CO—, —NH—, —O—, —S— and combinations of these groups. The divalent linking group (L) is more preferably based on combination of at least two divalent groups selected from the group consisting of alkylene group, arylene group, —CO—, —NH—, —O— and S—. The divalent linking group (L) is most preferably based on combination of at least two divalent groups selected from the group consisting of alkylene group, arylene group, —CO— and O—. The number of carbon atoms of the alkylene group is preferably 1 to 12. The number of carbon atoms of the alkenylene group is preferably 2 to 12. The number of carbon atoms of the arylene group is preferably 6 to 10.

Examples of the divalent coupling group (L) are listed below. The left end binds with the discotic core (D), and the right end binds with the polymerizable group (P). AL represents an alkylene group or an alkenylene group, and AR represents an arylene group. The alkylene group, alkenylene group and arylene group may have a substituent (e.g., alkyl group).

L1:-AL-CO—O-AL-,
L2:-AL-CO—O-AL-O—,
L3:-AL-CO—O-AL-O-AL-,
L4:-AL-CO—O-AL-O—CO—,
L5:—CO-AR-O-AL-,
L6:—CO-AR-O-AL-O—,
L7:—CO-AR-O-AL-O—CO—,
L8:—CO—NH-AL-,
L9:—NH-AL-O—,
L10:—NH-AL-O—CO—,
L11:—O-AL-,
L12:—O-AL-O—,
L13:—O-AL-O—CO—,
L14:—O-AL-O—CO—NH-AL-,
L15:—O-AL-S-AL-,
L16:—O—CO-AR-O-AL-CO—,
L17:—O—CO-AR-O-AL-O—CO—,
L18:—O—CO-AR-O-AL-O-AL-O—CO—,
L19:—O—CO-AR-O-AL-O-AL-O-AL-O—CO—,
L20:—S-AL-,
L21:—S-AL-O—,
L22:—S-AL-O—CO—,
L23:—S-AL-S-AL-, and
L25:—S-AR-AL-.

The polymerizable group (P) in formula (A) is determined depending on types of the polymerization reaction.

Examples of the polymerizable group (P) are shown below.

—CH=CH$_2$ (P1)

—C≡CH (P2)

—CH$_2$—C≡CH (P3)

—NH$_2$ (P4)

—SO$_3$H (P5)

—CH$_2$—CH—CH$_2$ with epoxide O (P6)

—C=CH$_2$
     |
     CH$_3$ (P7)

—CH=CH—CH$_3$ (P8)

—N=C=S (P9)

—SH (P10)

—CHO (P11)

—OH (P12)

—CO$_2$H (P13)

—N=C=O (P14)

—CH=CH—C$_2$H$_5$ (P15)

—CH=CH—n-C$_3$H$_7$ (P16)

-continued

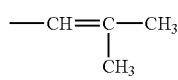 (P17)

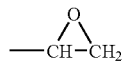 (P18)

The polymerizable group, P, is preferably selected from the unsaturated polymerizable group such as P1, P2, P3, P7, P8, P15, P16 and P17, or the epoxy group such as P6 and P18; more preferably selected from unsaturated polymerizable group; and much more preferably selected from the ethylenic unsaturated polymerizable group such as P1, P7, P8, P15, P16 and P17.

In formula (A), n is an integer from 4 to 12. The value represented by "n" is decided depending on the type of the disk-shaped core (D). The plural sets of L and P may be same or different from each other, and are preferably same each other. The amount of the liquid crystal compound in the liquid crystal composition is preferably from 50 to 99.9% by mass, more preferably from 70 to 99.9% by mass, and more preferably from 80 to 99.5 part by mass, with respect to the total mass of the liquid crystal composition (when the composition contains a solvent, the total mass of the solid content.

plasticizers, surfactants, and polymerizable monomers may be added together with the liquid crystalline compound such that the uniformity of a coated film, the strength of the film and the alignment of the liquid crystal molecules can be improved. It is preferable that these additives are compatible with the liquid crystal molecules, and do not deteriorate the alignment.

The polymerizable monomer includes a radical polymerizable compound or a cation polymerizable compound. Preferably, the polymerizable monomer is a polyfunctional radical polymerizable monomer and is preferably copolymerizable with a liquid crystal compound containing a polymerizable group. For example, the polymerizable monomer is disclosed in the paragraphs [0018] to [0020] of JPA No. 2002-296423. The additive amount of the compound is usually in a range of 1 to 50% by mass and is preferably in a range of 5 to 30% by mass with respect to the discotic liquid crystalline molecules.

An example of the polymer may be cellulose ester. A preferred example of the cellulose ester is disclosed in the paragraph [0178] of JPA No. 2000-155216. In order to prevent the alignment of the liquid crystalline molecules from deteriorating, the additive amount of the polymer is preferably in a range of 0.1 to 10% by mass, and more preferably in a range of 0.1 to 8% by mass for the liquid crystalline molecules.

The surfactant may be selected any known surfactants, and preferably, selected from fluorine compounds. Examples of the fluorine compound include those described in JPA No. 2001-330725, [0028] to [0056], and JPA No. 2005-062673, [0069] to [0126]. Preferred examples of the fluorine compound include the fluoroaliphatic group-containing polymers described in JPA No. 2005-292351, [0054] to [0109].

Preferably, the first optically-anisotropic layer is prepared as follows. A composition containing at least one type of a liquid-crystal compound is disposed on the surface of a polymer film that serves as a second optically-anisotropic layer (e.g., the surface of an alignment film); and then the molecules of the liquid-crystal compound are aligned in a desired alignment state. The polymerization and curing is carried out thereby fix the alignment state. In order that the first optically-anisotropic layer satisfies the characteristics that it does not have a direction in which its retardation at 550 nm is 0 nm and that the direction in which the absolute value of its retardation at 550 nm is the smallest is neither in the normal line direction of the layer nor in the in-plane direction thereof, the molecules of the liquid-crystal compound (including both rod-shaped and discotic molecules) are preferably fixed in a hybrid alignment state.

The hybrid alignment means that the direction of the director of the liquid-crystal molecules continuously changes in the thickness direction of the layer. In rod-shaped molecules, the director is in the direction of the major axis thereof; and in discotic molecules, the director is a diameter of the discotic face thereof.

In order that the molecules of a liquid-crystal compound are aligned in a desired alignment state, and for the purpose of bettering the coating applicability and the curability of the composition, the composition may contain one or more additives.

For hybrid alignment of the molecules of a liquid-crystal compound (especially a rod-shaped liquid-crystal compound), an additive for controlling the alignment on the air interface side of the layer (hereinafter this may be referred to as "air-interface alignment controlling agent") may be added. The additive includes a low-molecular-weight or high-molecular-weight compounds having a hydrophilic group such as a fluoroalkyl group or a sulfonyl group. Specific examples of the air-interface alignment controlling agent usable herein are described in JPA No. 2006-267171.

When the composition is prepared as a coating liquid and the first optically-anisotropic layer is formed by coating with it, a surfactant may be added thereto for bettering the coating applicability of the liquid. As the surfactant, preferred is a fluorine compound concretely including, for example, the compounds described in JPA No. 2001-330725, paragraphs [0028] to [0056]. Also usable is a commercial product, Megafac F780 (by Dai-Nippon Ink).

Preferably, the coating composition contains a polymerization initiator. The polymerization initiator may be either a thermal polymerization initiator or a photopolymerization initiator; but preferred is a photopolymerization initiator as it is easy to control. Examples of the photo-polymerization initiator capable of generating radicals under irradiation with light include α-carbonyl compounds (those described in U.S. Pat. Nos. 2,367,661 and 2,367,670), acyloin ethers (those described in U.S. Pat. No. 2,448,828), α-hydrocarbon-substituted aromatic acyloin compounds (those described in U.S. Pat. No. 2,722,512), polynuclear quinone compounds (those described in U.S. Pat. Nos. 3,046,127 and 2,951,758), combinations of triarylimidazole dimer and p-aminophenyl ketone (those described in U.S. Pat. No. 3,549,367), acrydine and phenazine compounds (those described in JPA No. S60-105667 and U.S. Pat. No. 4,239,850), oxadiazole compounds (those described in U.S. Pat. No. 4,212,970), acetophenone-type compounds, benzoin ether-type compounds, benzyl-type compounds, benzophenone-type compounds and thioxanthone-type compounds. Examples of the acetophenone-type compound include 2,2-diethoxy acetophenone, 2-hydroxymethyl-1-phenylpropane-1-on, 4'-isopropyl-2-hydroxy-2-methyl-propiophenone, 2-hydroxy-2-methyl-propiophenone, p-dimethylamino acetone, p-tert-butyl dichloro acetophenone, p-tert-butyl trichloro acetophenone, and p-azidebenzal acetophenone. Examples of the benzyl-type compound include benzyl, benzyl dimethyl ketal, benzyl-β-methoxy ethyl acetal and 1-hydroxy cyclohexyl phenyl ketone. Examples of the benzoin ether compound include benzoin, benzoin methyl ether, benzoin ethyl ether, benzoin-n-propyl ether, benzoin isopropyl ether, benzoin-n-butyl ether, and benzoin isobutyl ether. Examples of the benzophenone-type compound include benzophenone, o-benzoyl methyl benzoate, 4,4'-bis diethylamino benzophenone and 4,4'-dichloro benzophenone. Examples of the thioxanthone-type compound include thioxanthone, 2-methyl thioxanthone, 2-ethyl thioxanthone, 2-isopropyl thioxanthone, 4-isopropyl thioxanthone, 2-chloro thioxanthone and 2,4-diethyl thioxanthone. Among the aromatic ketones functioning as a photo-sensitive radical polymerization initiator, acetophenone-type compounds and benzyl-type compounds are preferable, in terms of hardening properties, preservation stabilities, and odor. One or more selected from these photo-sensitive radical polymerization initiators maybe used depending on the desirable properties.

For the purpose of enhancing the effect, one or more sensitizers may be used in addition to the polymerization initiator. Examples of the sensitizer include n-butyl amine, triethyl amine, tri-n-butyl phosphine and thioxanthone.

Two or more polymerization initiators may be used in combination. The amount of the polymerization initiator in the coating liquid is preferably from 0.01 to 20% by mass, and more preferably from 0.5 to 5% by mass, with respect to the solid content of the coating liquid. Light-irradiation for polymerization of the liquid crystal compound is preferably carried out with UV-light.

The composition may further comprise at least one non-liquid-crystal polymerizable monomer along with the polymerizable liquid crystal compound. Examples of the polymerizable monomer include any compounds having a vinyl, vinyloxy, acryloyl or methacryloyl. Poly-functional monomers, having two or more polymerizable groups in a molecule, such as ethylene oxide-modified trimethylol propane acrylate are preferable in terms of durability.

The amount of the non-liquid-crystal polymerizable monomer is less than 15% around by mass, more preferably from 0 to 10% around by mass, with respect to the amount of the liquid crystal compound.

The first optically anisotropic layer may be prepared as follows. the composition is prepared as a coating liquid. The coating liquid is applied to a surface of an alignment layer formed on the support, and dried to remove the solvent therefrom. Then, the molecules of the liquid crystal compound are aligned in a desired state. The polymerization and curing is carried out to fix the alignment. In this way, the first optically anisotropic layer is prepared.

Any coating methods may be employed for applying the coating liquid to a surface. Examples of the coating method include a curtain coating method, a dip coating method, a spin-coating method, a printing coating method, a spray coating method, a slot coating method, a roll coating method, a slide coating method, a blade coating method, a gravure coating method and a wire-bar coating method.

Drying of the layer may be carried out under heat. When the solvent in the layer is removed from the layer by drying, the molecules of the liquid crystal compound are aligned. Then, the desired alignment state is obtained.

Next, polymerization is carried out with irradiation of UV-light and the alignment is fixed. In this way, the first optically anisotropic layer is prepared. The irradiation energy is preferably 20 mJ/cm$^2$ to 50 J/cm$^2$, more preferably 20 to 5000 mJ/cm$^2$ and much more preferably 100 to 800 mJ/cm$^2$. Irradiation may be carried out under heat to accelerate the photopolymerization reaction.

The thickness of the first optically anisotropic layer is not limited to any range, and preferably from 0.1 to 10 μm around, and more preferably from 0.5 to 5 μm around.

The first optically anisotropic layer may be formed by using an alignment layer. Examples of the usable alignment layer include polyvinyl alcohol films and polyimide films.

(Second Optically-Anisotropic Layer)

The optical compensation film of the invention has a second optically-anisotropic layer having Re(550) of from 20 to 150 nm and having retardation along the thickness-direction at a wavelength of 550 nm Rth(550) of from 40 to 110 nm. In the invention, not only the first optically-anisotropic layer formed of a liquid-crystal composition but also the second optically-anisotropic layer of a polymer film or the like that serves as the support for the first optically-anisotropic layer shares the retardation necessary for optical compensation. On the other hand, the film is given the optical compensation only by the optical characteristics of the first optically-anisotropic layer that, in the layer, there is no direction in which retardation at 550 nm of the layer is 0 nm and that the direction in which the absolute value of retardation at 550 nm of the layer is neither in the normal line direction nor in the in-plane direction of the layer, and therefore, when the share of the second optically-anisotropic layer in the retardation is too much, then the film could not maintain the optical compensation that could be attained conventionally. In the embodiments where the second optically-anisotropic layer has Re(550) and Rth(550) each falling within the above-mentioned range, the film can achieve the optical compensation that can be attained by a conventional optical compensation film having the same constitution, and in addition, the film can reduce the yellow color shift that may occur in oblique horizontal directions in the white state. From the same viewpoint, Re(550) of the second optically-anisotropic layer is preferably from 25 to 145 nm, more preferably from 30 to 140 nm. Rth(550) of the second optically-anisotropic layer is preferably from 45 to 105 nm, more preferably from 50 to 100 nm.

In the invention, preferably, the second optically-anisotropic layer is formed of a polymer film having a light transmittance, concretely a transmittance of light within a visible range of at least 80%. When the second optically-anisotropic layer is formed of such a polymer film, then the optical compensation film of the invention may be stuck to a polarizing element. In addition, the optical compensation film of the type may be incorporated in a liquid-crystal display device as a single member therein. The material of the polymer film is preferably a polymer excellent in optical properties, transparency, mechanical strength, thermal stability, water shieldability and isotropicity, but may be any one capable of forming a film that satisfies the above-mentioned optical characteristics necessary for the second optically-anisotropic layer. For example, a norbornene-type polymer, a polycarbonate polymer, a cyclic olefin-type polymer, a cellulosic polymer having an acetyl group in the side chains (hereinafter this may be referred to as cellulose acylate) or the like is formed into a film according to a solution-casting film formation method or a melt-casting film formation method, and then optionally the film is stretched. The film thus produced may have the optical characteristics necessary for the second optically-anisotropic layer. An additive capable of expressing Re and/or Rth may be added to the polymer film whereby the polymer film is made to have the above-mentioned optical characteristics.

The cellulose acylate composition which can be used for preparing the second optically anisotropic may contain cellulose acylates having only acetate group as a substituent or cellulose acylates having plural types of acyl groups as a substituent. Preferably, a total substitution degree of the acyl group of the cellulose acylate, which can be used for preparing the second optically anisotropic layer, is preferably from 2.3 to 3.0, and more preferably from 2.4 to 2.95.

Esters of mixed aliphatic acids further having residues of the aliphatic acids other than acetyl group may be used. The number of carbon atoms in the aliphatic acyl group, or in other words the residue of the aliphatic acid, is preferably from 2 to 20; and examples of the aliphatic acyl group include acetyl, propionyl, butyryl, isobutyryl, valeryl, pivaloyl, pentanoyl, hexanoyl, lauryl and stearoyl. Among these, cellulose acylates, having an acetyl group and other acyl group such as propionyl, butyryl, pentanoyl and hexanoyl, are preferable; and among these, those having a substitution degree satisfying formulas (1) to (3) are more preferable.

$$2.0 \leq X+Y \leq 3.0 \quad (1)$$

$$0 \leq X \leq 2.0 \text{ and} \quad (2)$$

$$1.2 \leq Y \leq 2.9 \quad (3)$$

In the formulas, X indicates a substitution degree of acetyl group; Y indicates the total substitution degree of propionyl, butyryl, pentanoyl and hexanoyl groups in the cellulose acylate.

The cellulose acylate has preferably a weight average degree of polymerization of 350 to 800, and more preferably a weight average degree of polymerization of 370 to 600. The cellulose acylate used in the present invention has preferably a number average molecular weight of 70000 to 230000, more preferably 75000 to 230000, and still more preferably 78000 to 120000.

The cellulose acylate film to be used as the second optically anisotropic layer may be produced according to a molten cast method or a solvent cast method, and preferably produced according to a solvent cast method. Examples of preparation of the cellulose acylate film using the solvent cast method may include U.S. Pat. Nos. 2,336,310, 2,367,603, 2,492,078, 2,492,977, 2,492,978, 2,607,704, 2,739,069, and 2,739,070, British Patent Nos. 640731 and 736892, JPB Nos. syo 45-4554 and syo 49-5614, and JPA Nos. syo 60-176834, syo 60-203430, and syo 62-115035. The cellulose acylate film may be stretched. A method of stretching the cellulose acylate film and the condition thereof are disclosed in JPA Nos. syo 62-115035, hei 4-152125, hei 4-284211, hei 4-298310, and hei 11-48271.

Examples of the materials of the cyclicolefin-type polymer film to be used as the second optically anisotropic layer include homopolymers and copolymers.

Examples of cyclicolefin-type homopolymers and copolymers usable include ring-opened polymers of polycyclic monomers, etc. Specific examples of polycyclic monomers are the following compounds, to which, however, the invention should not be limited.

bicyclo[2.2.1]hept-2-ene,
tricyclo[4.3.0.1$^{2,5}$)-8-decene,
tricyclo[4.4.0.1$^{2,5}$)-3-undecene,
tetracyclo[4.4.0.1$^{2,5}$.1$^{7,10}$]-3-dodecene,
pentacyclo[6.5.1.1$^{3,6}$.0$^{2,7}$.0$^{9,13}$]-4-pentadecene,
5-methylbicyclo[2.2.1]hept-2-ene,
5-ethylbicyclo[2.2.1]hept-2-ene,
5-methoxycarbonylbicyclo[2.2.1]hept-2-ene,
5-methyl-5-methoxycarbonylbicyclo[2.2.1]hept-2-ene,
5-cyanobicyclo[2.2.1]hept-2-ene,
8-methoxycarbonyltetracyclo[4.4.0.1$^{2,5}$.1$^{7,10}$]-3-dodecene,
8-ethoxycarbonyltetracyclo[4.4.0.1$^{2,5}$.1$^{7,10}$]-3-dodecene,
8-n-propoxycarbonyltetracyclo[4.4.0.1$^{2,5}$.1$^{7,10}$]-3-dodecene,
8-isopropoxycarbonyltetracyclo[4.4.0.1$^{2,5}$.1$^{7,10}$]-3-dodecene,
8-n-butoxycarbonyltetracyclo[4.4.0.1$^{2,5}$.1$^{7,10}$]-3-dodecene,
8-methyl-8-methoxycarbonyltetracyclo[4.4.0.1$^{2,5}$.1$^{7,10}$]-3-dodecene,
8-methyl-8-ethoxycarbonyltetracyclo[4.4.0.1$^{2,5}$.1$^{7,10}$]-3-dodecene,
8-methyl-8-n-propoxycarbonyltetracyclo[4.4.0.1$^{2,5}$.1$^{7,10}$]-3-dodecene,
8-methyl-8-isopropoxycarbonyltetracyclo[4.4.0.1$^{2,5}$.1$^{7,10}$]-3-dodecene,
8-methyl-8-n-butoxycarbonyltetracyclo[4.4.0.1$^{2,5}$.1$^{7,10}$]-3-dodecene,
5-ethylidenebicyclo[2.2.1]hept-2-ene,
8-ethylidenetetracyclo[4.4.0.1$^{2,5}$.1$^{7,10}$]-3-dodecene,
5-phenylbicyclo[2.2.1]-hept-2-ene,
8-phenyltetracyclo[4.4.0.1$^{2,5}$.1$^{7,10}$]-3-dodecene,
5-fluorobicyclo[2.2.1]hept-2-ene,
5-fluoromethylbicyclo[2.2.1]hept-2-ene,
5-trifluoromethylbicyclo[2.2.1]hept-2-ene,
5-pentafluoroethylbicyclo[2.2.1]hept-2-ene,
5,5-difluorobicyclo[2.2.1]hept-2-ene,
5,6-difluorobicyclo[2.2.1]hept-2-ene,
5,5-bis(trifluoromethyl)bicyclo[2.2.1]hept-2-ene,
5,6-bis(trifluoromethyl)bicyclo[2.2.1]hept-2-ene,
5-methyl-5-trifluoromethylbicyclo[2.2.1]hept-2-ene,
5,5,6-trifluorobicyclo[2.2.1]hept-2-ene,
5,5,6-tris(fluoromethyl)bicyclo[2.2.1]hept-2-ene,
5,5,6,6-tetrafluorobicyclo[2.2.1]hept-2-ene,
5,5,6,6-tetrakis(trifluoromethyl)bicyclo[2.2.1]hept-2-ene,
5,5-difluoro-6,6-bis(trifluoromethyl)bicyclo[2.2.1]hept-2-ene,
5,6-difluoro-5,6-bis(trifluoromethyl)bicyclo[2.2.1]hept-2-ene,
5,5,6-trifluoro-5-trifluoromethylbicyclo[2.2.1]hept-2-ene,
5-fluoro-5-pentafluoroethyl-6,6-bis(trifluoromethyl)bicyclo[2.2.1]hept-2-ene,
5,6-difluoro-5-heptafluoro-iso-propyl-6-trifluoromethylbicyclo [2.2.1]hept-2-ene,
5-chloro-5,6,6-trifluorobicyclo[2.2.1]hept-2-ene,
5,6-dichloro-5,6-bis(trifluoromethyl)bicyclo[2.2.1]hept-2-ene
5,5,6-trifluoro-6-trifluoromethoxybicyclo[2.2.1]hept-2-ene,
5,5,6-trifluoro-6-heptafluoropropoxybicyclo[2.2.1]hept-2-ene,
8-fluorotetracyclo[4.4.0.1$^{2,5}$.1$^{7,10}$]-3-dodecene,
8-fluoromethyltetracyclo[4.4.0.1$^{2,5}$.1$^{7,10}$]-3-dodecene,
8-difluoromethyltetracyclo[4.4.0.1$^{2,5}$.1$^{7,10}$]-3-dodecene,
8-trifluoromethyltetracyclo[4.4.0.1$^{2,5}$.1$^{7,10}$]-3-dodecene,
8-pentafluoroethyltetracyclo[4.4.0.1$^{2,5}$.1$^{7,10}$]-3-dodecene,
8,8-difluorotetracyclo[4.4.0.1$^{2,5}$.1$^{7,10}$]-3-dodecene,
8,9-difluorotetracyclo[4.4.0.1$^{2,5}$.1$^{7,10}$]-3-dodecene,
8,8-bis(trifluoromethyl)tetracyclo[4.4.0.1$^{2,5}$.1$^{7,10}$]-3-dodecene,
8,9-bis(trifluoromethyl)tetracyclo[4.4.0.1$^{2,5}$.1$^{7,10}$]-3-dodecene,
8-methyl-8-trifluoromethyltetracyclo[4.4.0.1$^{2,5}$.1$^{7,10}$]-3-dodecene,
8,8,9-trifluorotetracyclo[4.4.0.1$^{2,5}$.1$^{7,10}$]-3-dodecene,
8,8,9-tris(trifluoromethyl)tetracyclo[4.4.0.1$^{2,5}$.1$^{7,10}$]-3-dodecene,
8,8,9,9-tetrafluorotetracyclo[4.4.0.1$^{2,5}$.1$^{7,10}$]-3-dodecene,
8,8,9,9-tetrakis(trifluoromethyl)tetracyclo[4.4.0.1$^{2,5}$.1$^{7,10}$]-3-dodecene,
8,8-difluoro-9,9-bis(trifluoromethyl)tetracyclo[4.4.0.1$^{2,5}$.1$^{7,10}$]-3-dodecene, 8,9-difluoro-8,9-bis(trifluoromethyl)tetracyclo[4.4.0.1$^{2,5}$.
1$^{7,10}$]-3-dodecene,
8,8,9-trifluoro-9-trifluoromethyltetracyclo[4.4.0.1$^{2,5}$.1$^{7,10}$]-3-dodecene,
8,8,9-trifluoro-9-trifluoromethoxytetracyclo[4.4.0.1$^{2,5}$.
1$^{7,10}$]-3-dodecene,
8,8,9-trifluoro-9-pentafluoropropoxytetracyclo[4.4.0.
1$^{2,5}$.1$^{7,10}$]-3-dodecene,
8-fluoro-8-pentafluoroethyl-9,9-bis(trifluoromethyl)tetracyclo
[4.4.0.1$^{2,5}$.1$^{7,10}$]- 3-dodecene,
8,9-difluoro-8-pentafluoro-isopropyl-9-trifluoromethyltetracyclo
[4.4.0.1$^{2,5}$.1$^{7,10}$]-3-dodecene,
8-chloro-8,9,9-trifluorotetracyclo[4.4.0.1$^{2,5}$.1$^{7,10}$]-3-dodecene,
8,9-dichloro-8,9-bis(trifluoromethyl)tetracyclo[4.4.0.
1$^{2,5}$.1$^{7,10}$]-3-dodecene,
8-(2,2,2-trifluoroethoxycarbonyl)tetracyclo[4.4.0.1$^{2,5}$.
1$^{7,10}$]-3-dodecene,
8-methyl-8-(2,2,2-trifluoroethoxycarbonyl)tetracyclo
[4.4.0.1$^{2,5}$0.1$^{7,10}$]-3-dodecene.

One or more of these may be used, either singly or as combined.

Not specifically defined, the molecular weight of those compounds is, in general, preferably from 5000 to 500000, more preferably from 10000 to 100000. As commercially-available cycloolefin-base polymers, ARTON series (by JSR), ZEONOR series (by Nippon Zeon), ZEONEX series (by Nippon Zeon) and ESSINA (by Sekisui Chemical Industry) are usable. Commercially available polymer films may be used after they are subjected to a stretching treatment so as to have the optical characteristics satisfying the above-mentioned numerical relations. For example, when ZEONOR series polymer films are used, they may be stretched in the machine direction (in the lengthwise direction of films) and/or in the cross direction (in the widthwise direction of films), thereby to be polymer films capable of satisfying the optical characteristics required for the second optically anisotropic layer. Preferably, the stretching ratio in machine-direction is from 1 to 150%, and the stretching ratio in cross-direction is from 2 to 200%.

In order to obtain films having the optical characteristics required for the second optically anisotropic layer, it is desirable that the films produced according to a solvent casting method is stretched in the machine direction and the cross direction of the films. Preferably, the draw ratio is from 1 to 200%. The stretching in the machine direction may be attained by the difference in the rotation of rolls that support the film; and the stretching in the cross direction may be attained by the use of a tenter.

Examples of the material of the norbornene-type polymer film to be used as the second optically anisotropic layer include commercially available norbornene-type polymers such as "ARTON", produced by JSR, ZEONEX produced by ZEON CORPORATION. The norbornene-type polymer film may be subjected to a stretching treatment to have optical characteristics required for the second optically anisotropic layer.

Examples of the polycarbonate-type materials of the polycarbonate-type film to be used as the second optically anisotropic layer include commercially available polycarbonate-type polymers such as PURE-ACE produced by TEIJIN, ELMECH produced by KANEKA, and Illuminex produced by Japanese General Electric Plastics.

The polymer films for use as the second optically anisotropic layer may contain various additives such as Rth enhancers, Rth reducers, Re enhancers and Re reducers to show optical characteristics required for the second optically anisotropic layer. It is noted that the term "Rth enhancer" is used for any compounds capable of developing or enhancing birefringence along the thickness direction. Preferably the compounds having an absorption peak at a wavelength from 250 nm to 380 nm and exhibiting high polarizability anisotropy are employed as the Rth enhancer. The amount of the Rth enhancer in the polymer film is preferably from 0.1 to 30% by mass, more preferably from 1 to 25% by mass and more preferably from 3 to 15% by mass with respect to the total amount of the polymer material such as cellulose acylate.

The Rth enhancers which don't have influence on Re in plane generated by a stretching treatment are preferable; and preferable examples of the Rth enhancer include discotic compounds.

Examples of the Re enhancer usable include rod-like aromatic compounds described in JPA No. 2004-50516, pages 11-14.

Examples of Rth enhancer usable include compounds described in JPA No. 2005-301227.

The amount of the additive in the polymer film is preferably from 0.01 to 30% by mass with respect to the amount of the polymet material.

The polymer film may contain fine particles as a mat agent. Fine particles usable as a mat agent are, for example, those of silicon dioxide, titanium dioxide, aluminium oxide, zirconium oxide, calcium carbonate, calcium carbonate, talc, clay, calcined kaolin, calcined calcium silicate, calcium silicate hydrate, aluminium silicate, magnesium silicate and calcium phosphate. As the fine particles, preferred are those containing silicon as their turbidity is low; and more preferred is silicon dioxide. Fine particles of silicon dioxide are available as commercial products such as Aerosil R972, R972V, R974, R812, 200, 200V, 300, R202, OX50, TT600 (all by Nippon Aerosil). Also available are commercial products of Aerosil R976 and R811 (both by Nippon Aerosil). Any of these are usable herein as a mat agent.

The amount of the mat agent to be used is preferably from 0.01 to 0.3 parts by mass relative to 100 parts by mass of the polymer component that contains a cycloolefin-base homopolymer and/or copolymer.

The polymer film for use as the second optically-anisotropic layer is preferably surface-treated for bettering the adhesiveness to the first optically-anisotropic layer or to a polarizing film. Concretely, the surface treatment includes corona discharge treatment, glow discharge treatment, flame treatment, acid treatment, alkali treatment and UV irradiation treatment. Also preferably, an undercoat layer may be formed on the film.

[Polarizing Plate]

The invention also relates to a polarizing plate comprising at least the optical compensation film of the invention and a polarizing film. When the polarizing plate of the invention is incorporated into a liquid-crystal display device, preferably, the polarizing plate is so disposed in the device that the optical compensation film thereof of the invention is on the side of the liquid-crystal cell in the device. Also preferably, the surface of the second optically-anisotropic layer is stuck to the surface of the polarizing film; and preferably, the in-plane slow axis of the second optically-anisotropic layer crosses the transmission axis of the polarizing film at an angle of 0 degree. The crossing angle may not always be 0 degree strictly, and an error of ±5 degrees acceptable in production does not have any influence on the effect of the invention, and is therefore acceptable in the invention. Also preferably, a protective film such as a cellulose acylate film is stuck to the other surface of the polarizing film.

Figure 2:
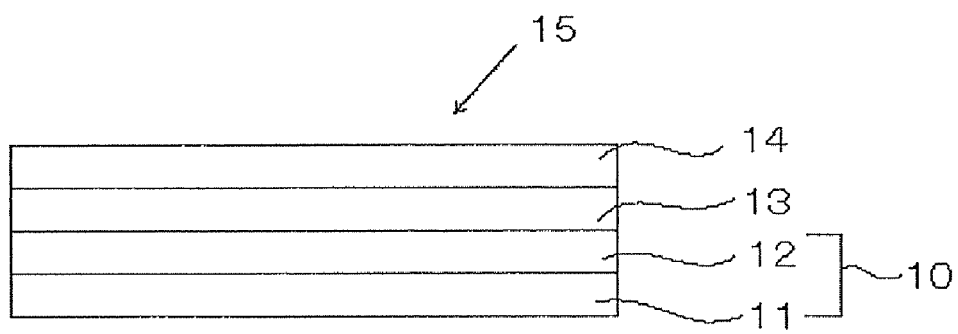
FIG. 2 is a schematic cross-sectional view of one embodiment of a polarizing plate of the invention.

FIG. 2 shows a schematic cross-sectional view of one embodiment of a polarizing plate of the invention. The polarizing plate 15 shown in FIG. 2 comprises a polarizing film 13, and has, on its surfaces, an optical compensation film 10 of the invention and a protective film 14 that protect the polarizing film 13. The second optically-anisotropic layer 12 of the optical compensation film 10 is formed of a polymer film, and its back, or that is its face not coated with the first optically-anisotropic layer 11 is stuck to the surface of the polarizing film 13. In case where the polarizing plate 15 is incorporated into a liquid-crystal display device, the optical compensation film 10 is disposed on the side of the liquid-crystal cell in the device. Though not shown in the drawing, the polarizing plate 15 of FIG. 2 may have any other functional layer, and for example, a diffusion layer, an antiglare layer and others may be disposed outside the protective film 14.

Various material usable in fabricating the polarizing plate of the invention are described below.
(Polarizing Film)

Examples of a polarizing film include an iodine-base polarizing film, a dye-base polarizing film with a dichroic dye, and a polyene-base polarizing film, and any of these is usable in the invention. The iodine-base polarizing film and the dye-base polarizing film are produced generally by the use of polyvinyl alcohol films.
(Protective Film)

As the protective film to be stuck to the other surface of the polarizing film, preferably used is a transparent polymer film. "Transparent" means that the film has a light transmittance of at least 80%. As the protective film, preferred are cellulose acylate films and polyolefin films. Of cellulose acylate films, preferred are cellulose triacetate film. Of polyolefin films, preferred are cyclic polyolefin-containing polynorbornene films.

Preferably, the thickness of the protective film is from 20 to 500 μm, more preferably from 50 to 200 μm.

The polarizing plate of the invention may be produced as a long-size polarizing plate. For example, a polymer film is used as the second optically-anisotropic layer, and on its surface, a coating liquid for alignment film formation is optionally applied to form an alignment film thereon, and subsequently, a coating liquid for first optically-anisotropic layer formation is continuously applied onto it and dried to make the coating film have a desired alignment state, and thereafter through irradiation with light, the alignment state is fixed to form a first optically-anisotropic layer. In that manner, a long-size optical film of the invention is fabricated, and this is wound up as a roll. Separately, a roll of a long-size polarizing film and a roll of a long-size polymer film for protective film are prepared and, while unrolled, they are stuck together according to a roll-to-roll method to fabricate a long-size polarizing plate. The long-size polarizing plate may be, for example, wound up as a roll and may be transported or stored; and before it is incorporated into a liquid-crystal display device, it may be cut into a desired size.
[Liquid-Crystal Display Device]

The optical compensation film and the polarizing plate of the invention may be used in various types of liquid-crystal display devices. They may be used in any of transmissive, reflective or transflective liquid-crystal display devices. Above all, they are especially effective for a liquid-crystal display device that comprises a pair of substrates at lease one of which has an electrode and which are disposed to face each other, and a nematic liquid-crystal material sandwiched between the pair of substrates, wherein the liquid-crystal molecules of the nematic liquid-crystal material are aligned nearly vertically to the surfaces of the pair of substrates in the black state, especially for a twisted nematic (TN)-mode liquid-crystal display device. In particular, the invention is especially effective in an embodiment of a transmissive twisted nematic-mode liquid-crystal display device.

In the embodiments where the optical compensation film or the polarizing plate of the invention is used in a TN-mode liquid-crystal display device, preferably, two optical compensation films of the invention are disposed symmetrically to the liquid-crystal cell that is the center between the two, and also preferably, the polarizing plates of the invention are disposed symmetrically to the liquid-crystal cell that is the center between the two, or that is, the upper and lower polarizing plates (on the viewers' side and on the backlight side). The liquid-crystal layer of the TN-mode liquid-crystal cell is, in general, preferably such that the product of the thickness d (micron) and the refractivity anisotropy Δn of the layer, Δn·d is from 0.1 to 1.5 μm or so.

Figure 3:
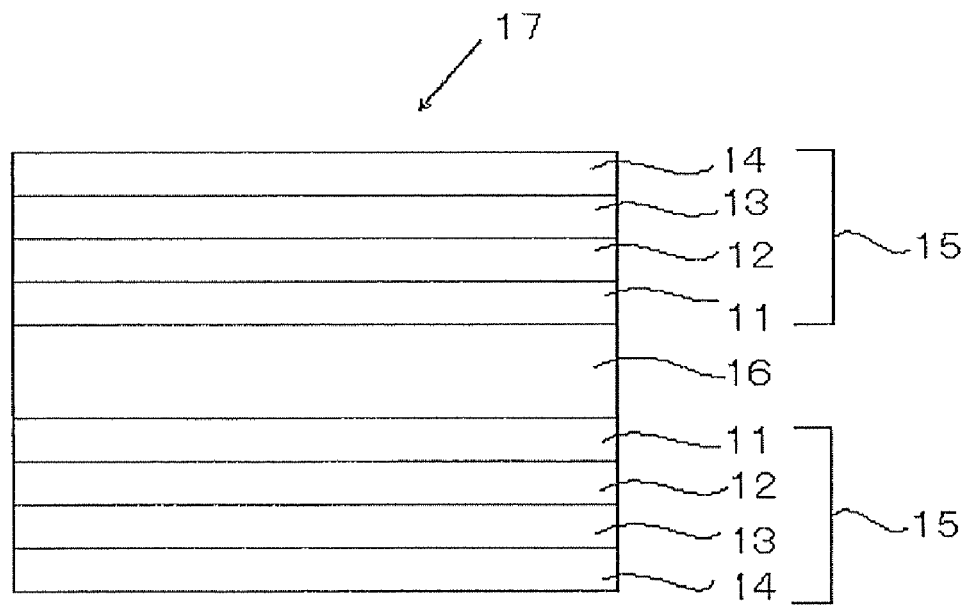
FIG. 3 is a schematic cross-sectional view of one embodiment of a liquid-crystal display device of the invention.

FIG. 3 shows a schematic cross-sectional view of a TN-mode liquid-crystal display device, one embodiment of a liquid-crystal display device of the invention. The liquid-crystal display device shown in FIG. 3 comprises a TN-mode liquid-crystal cell 16, and has two polarizing plates 15 of the invention symmetrically disposed above and below the cell 16 to sandwich it therebetween. The liquid-crystal cell 16 has a liquid-crystal layer comprising a nematic liquid-crystal material, and the liquid-crystal layer is so constituted that it is in a twisted alignment state in the absence of driving voltage application thereto and that it is in a vertical alignment state to the substrate face in the presence of driving voltage application thereto. The upper and lower polarizing plates 15 are so disposed that the transmission axes of their polarizing films 13 cross perpendicularly to each other; and therefore, in the absence of driving voltage application to the device, the linear polarized light having entered the liquid-crystal cell 16 from the backlight (not shown) disposed on the back of the lower polarizing plate 15 rotates by 90° along the twisted alignment of the liquid-crystal layer, then passes through the transmission axis of the upper polarizing plate 15 to give white state. On the other hand, in the presence of driving voltage application to the device, the linear polarized light having entered the liquid-crystal cell 16 keeps its polarization state and directly passes through it as it is, and is therefore blocked by the upper polarizing plate 15 to give black state. The optical compensation films 10 of the invention disposed above and below the liquid-crystal cell 16 compensate the birefringence that occurs in oblique directions in the black state, and contribute toward reducing the yellow color shift that may occur in oblique horizontal directions in the white state.

Figure 4:
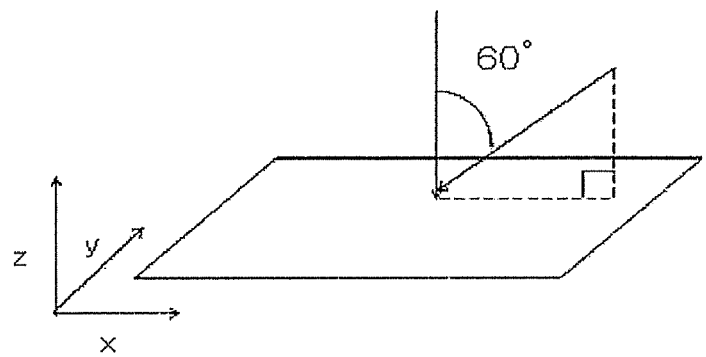
FIG. 4 is a view showing a method for determining the yellow color shift observed in oblique horizontal directions of a liquid crystal display device in the with state.

The TN-mode liquid-crystal display device having the optical compensation film of the invention is characterized in that its viewing angle is widened and its yellow color shift in oblique horizontal directions at in the white state is reduced. Concretely, the TN-mode liquid-crystal display device of the invention can attain a viewing angle (the total of viewing angles in the upper and lower vertical direction and in the right and left horizontal direction) of 320° or more that realizes a contrast of at least 10. In addition, as shown in FIG. 4, when the normal line direction (z axis) to the display panel face (xy plane) is defined as a polar angle 0°, and when this is inclined from the polar angle 0° to 60° on the panel side around the axis of y=0, then the device in the white state can attain a yellow color shift (Δv') of at most 0.03.

EXAMPLES

The invention is described more concretely with reference to the following Examples, in which the material and the reagent used, their amount and the ratio, the details of the treatment and the treatment process may be suitably modified or changed not overstepping the spirit and the scope of the invention. Accordingly, the invention should not be limited by the Examples mentioned below.

Example 1

(Formation of Second Optically-Anisotropic Layer (Cellulose Acylate Film 1))

The ingredients shown in the following Table were mixed to prepare a cellulose acylate solution. The cellulose acylate solution was cast on a metal support, and the formed web was peeled away from the support, and stretched in TD direction by 20% at 185° C. to produce a cellulose acylate film 1. TD direction means the direction perpendicular to the film traveling direction. After stretched, the thickness of the film was 80 μm.

| Ingredient | |
|---|---|
| Cellulose acylate having a degree of acetyl substitution of 2.94 | 100 mas. pts. |
| Triphenyl phosphate | 3 mas. pts. |
| Biphenyl phosphate | 2 mas. pts. |
| Retardation-controlling agent (1) | 5 mas. pts. |
| Retardation-controlling agent (2) | 2 mas. pts. |
| Methylene chloride | 644 mas. pts. |
| Methanol | 56 mas. pts. |

Retardation-Controlling Agent (1):

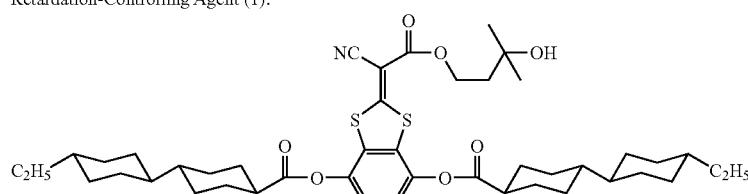

Retardation-Controlling Agent (2):

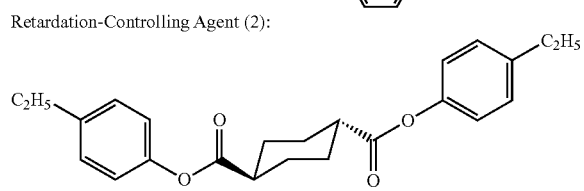

Re(550) of the cellulose acylate film 1 obtained in the above was 80 nm, and Rth(550) thereof was 60 nm.

(Formation of Alignment Film)

On the cellulose acylate film 1, a coating liquid having the formulation mentioned below was applied in an amount of 24 mL/m², using a wire bar coater of #14. This was dried with hot air at 100° C. for 120 seconds. Next, with the machine direction (MD direction) of the cellulose acylate film 1 regarded as 0°, the coating film formed on it was rubbed in the direction of 0°.

(Composition of Coating Liquid for Alignment Film)

Modified Polyvinyl Alcohol Mentioned Below

| | |
|---|---|
| | 40 mas. pts. |
| Water | 728 mas. pts. |
| Methanol | 228 mas. pts. |
| Glutaraldehyde (crosslinking agent) | 2 mas. pts. |
| Citrate (AS3, by Sankyo Chemical) | 0.69 mas. pts. |

Modified Polyvinyl Alcohol:

$-(CH_2-CH)_{87.8}- -(CH_2-CH)_{12.0}-$
       |                    |
       OH                   O—CO—CH₃

$-(CH_2-CH)_{0.2}-$
       |
       O—CO—⌬—O—(CH_2)_4—O—CO—CH=CH_2

(Formation of First Optically-Anisotropic Layer)

Coating liquid (1) for first optically-anisotropic layer having the formulation mentioned below was continuously applied onto the alignment film surface using a wire bar of #1.6. Then the film was heated in the constant temperature bath of 120° C. for 90 seconds, to thereby align the discotic liquid-crystal compound. Next, this was irradiated with UV rays by using a high-pressure mercury lamp of which output power was 160 W/cm for one minute to thereby promote the crosslinking reaction to fix the aligned discotic liquid-crystal compound. Next, this was left cooled to room temperature. In this way, a first optically anisotropic layer and an optical compensation film having thereon were produced.

| Formulation of Coating Liquid (1) for First Optically-Anisotropic Layer | |
|---|---|
| Methy ethyl ketone | 300.0 mas. pts. |
| Discotic liquid-crystal compound (1) shown below | 90.0 mas. pts. |
| Discotic liquid-crystal compound (2) shown below | 10.0 mas. pts. |
| Agent for controlling alignment at air-interface shown below | 1.0 mas. pts. |
| Photopolymerization initiator (Irgacure 907, by Ciba-Geigy) | 3.0 mas. pts. |
| Sensitizer (Kayacure DETX, by Nippon Kayaku) | 1.0 mas. pts. |

It is noted that the combination of Discotic liquid crystal compounds (1) and (2) is shown in the following table as No. 1. The combinations of Nos. 2 to 8 shown in the following table are the combinations of discotic compounds used in the examples described later; and, in the examples, the formulation of each coating liquid prepared for a first optically anisotropic layer was same as that of Coating liquid (1) described above.

TABLE A

| No. | Discotic Liquid Crystal Compound (1) | Discotic Liquid Crystal Compound (2) |
|---|---|---|
| 1 | Discotic Liquid Crystal Compound-1 shown below | |
| 2 | D-112 (described in JPA No. 2006-76992) | |
| 3 | D-112 (described in JPA No. 2006-76992) | Discotic Liquid Crystal Compound-1 shown below |
| 4 | D-304 (described in JBA No. 2006-76992) | Discotic Liquid Crystal Compound-1 shown below |
| 5 | D-224 (described in JPA No. 2007-2220) | Discotic Liquid Crystal Compound-1 shown below |
| 6 | D-227 (described in JBA No. 2007-2220) | Discotic Liquid Crystal Compound-1 shown below |
| 7 | D-10 (described in JPA No. 2007-2220) | Discotic Liquid Crystal Compound-1 shown below |
| 8 | D-286 (described in JBA No. 2007-2220) | Discotic Liquid Crystal Compound-1 shown below |

Discotic Liquid Crystal Compound-1

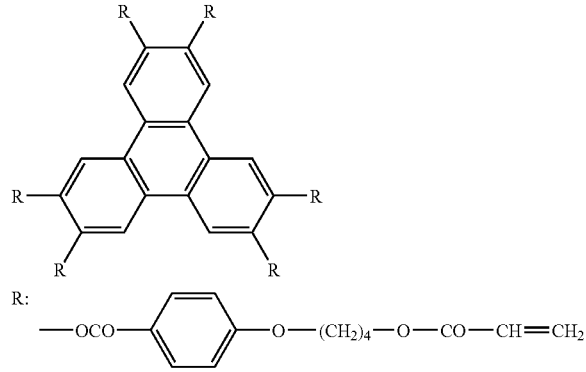

Agent for Controlling Alignment at Air-Interface

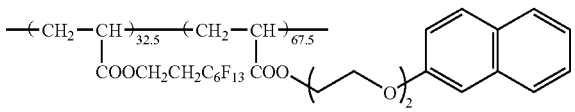

(Determination of Optical Characteristics)

Using KOBRA 21ADH, the in-plane retardation at a wavelength of 550 nm, Re(550) of the formed first optically-anisotropic layer was measured, and this was 26 nm. In the first optically-anisotropic layer, the molecules of the discotic compound were fixed in a hybrid alignment state, and the layer did not have a direction in which its retardation was 0 nm, and the direction in which the absolute value of its retardation was the smallest was neither in the normal line direction nor in the in-plane direction of the layer. This was confirmed as follows: Light having a wavelength of 550 nm was applied to the film in the directions stepwise inclined to 50 degrees from the normal line direction of the film at intervals of 10 degrees on one side, and the retardation of the film was measured at the inclined 6 points in all. The found data of the retardation of the film were processed with KOBRA 21ADH, based on the estimated value of the mean refractive index and the inputted thickness thereof, and the optical characteristics as above of the film were confirmed.

(Fabrication of Polarizing Plate)

A polyvinyl alcohol (PVA) film having a thickness of 80 μm was dyed by dipping it in an aqueous iodine solution having an iodine concentration of 0.05% by mass at 30° C. for 60 seconds, and then while dipped in an aqueous boric acid solution having a boric acid concentration of 4% by mass, this was stretched in the machine direction by 5 times the original length, and thereafter dried at 50° C. for 4 minutes to give a polarizing film having a thickness of 20 μm.

The back of the optical film of cellulose acylate film produced in the above (the face thereof not coated with the first optically-anisotropic layer) was dipped in an aqueous sodium hydroxide solution (1.5 mol/L) at 55° C., and then fully washed with water to remove sodium hydroxide. Next, this was dipped in an aqueous diluted sulfuric acid solution (0.005 mol/L) at 35° C. for 1 minute, then dipped in water to fully remove the aqueous diluted sulfuric acid solution. Finally, the sample was fully dried at 120° C.

The optical film saponified in the manner as above was combined with a commercial cellulose acetate film that had been saponified also in the same manner as above, the above-mentioned polarizing film was sandwiched between them, and these were stuck together with a polyvinyl alcohol adhesive so that the saponified surfaces of the films were face each other, thereby fabricating a polarizing plate. The commercial cellulose acetate film was Fujitac TF80UL (by FUJIFILM). In this, the polarizing film and the protective film on both surfaces of the polarizing film were produced all as rolls, and therefore, the machine direction of every roll was parallel to each other, and the rolls were unrolled and continuously stuck together. Accordingly, the absorption axis of the polarizing plate was parallel to the machine direction of the optical film roll (the casting direction in film formation)

(Construction of TN-Mode Liquid-Crystal Display Device)

A TN-mode liquid-crystal display device having the same constitution as in FIG. 3 was constructed. Concretely, in a liquid-crystal display device having a TN-mode liquid-crystal cell (Nippon Acer's AL2216W), a pair of polarizing plates were removed, and in place of them, the polarizing plate fabricated in the above was stuck each one on both the viewers' side and the backlight side, using an adhesive, in such a manner that its optical film could face the side of the liquid-crystal cell. In this, the two polarizing plates were so disposed that the transmission axis of the polarizing plate on the viewers' side was perpendicular to the transmission axis of the polarizing plate on the backlight side. In this way, TN-mode liquid-crystal display device 1 was constructed.

Example 2

(Formation of Second Optically-Anisotropic Layer (Cellulose Acylate Film 2))

A cellulose acylate film (TAC-TD80U, by FUJIFILM) was stretched in TD direction by 20% at 240° C. to prepare Cellulose acylate film 2. The thickness of the stretched film was 80 μm.

Re(550) of Cellulose acylate film 2 was 60 nm, and Re(550) thereof was 60 nm.

In the same manner as in Example 1, an alignment film and a first optically-anisotropic layer were formed, thereby fabricating Optical compensation film 2 and Polarizing plate 2; and using Polarizing plate 2 and in the same manner as in Example 1, TN-mode liquid-crystal display device 2 was constructed.

Comparative Example 1

(Preparation of Second Optically Anisotropic Layer (Cellulose Acylate Film C1))

The ingredients shown below were put into a mixing tank, heated and dissolved, and then a cellulose acetate solution was prepared.

(Formulation of Cellulose acetate solution)

| Ingredient | |
|---|---|
| Cellulose acylate having a degree of acetate of 60.7 to 61.1% | 100 mas. pts. |
| Triphenyl phosphate (plasticizer) | 7.8 mas. pts. |
| Biphenyl phosphate | 3.9 mas. pts. |
| Methylene chloride (first solvent) | 336 mas. pts. |
| Methanol (second solvent) | 29 mas. pts. |
| 1-bitanol (third solvent) | 11 mas. pts. |

Into another mixing tank, 16 mas.pts. Retardation enhancer shown below, 92 mas.pts. of methylene chloride and 8 mas.pts. of methanol were put, heated under stirring to give a retardation-enhancer solution.

A dope was prepared by mixing 474 mas.pts of the cellulose acetate solution and 31 mas.pts of the retardation-enhancer solution under stirring.

Retardation Enhancer

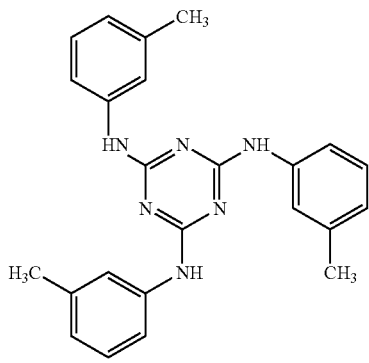

Using a band caster, the above-mentioned dope was cast. After the temperature of the film plane was 40° C., the film was dried with a hot air of 70° C. for one minute, and then the film having a residual solvent content of about 30% by mass was peeled away from the band. Held by tenter clips, this was stretched along the TD direction evenly, and dried with a hot air of 140° C. for ten minutes. In this way, Cellulose acetate film C1 having a residual solvent content of about 0.3% by mass and a thickness of 82 μm, was prepared. Re (550) of Cellulose acetate film C1 was −7 nm and Rth (550) thereof was 90 nm.

(Preparation of First Optically Anisotropic Layer)

Coating liquid C1 for a first optically anisotropic layer was prepared in the same manner as Coating liquid (1), except that 114.0 parts by mass of methyl ethyl ketone was used in the place of 300 parts by mass of methyl ethyl ketone. A first optically anisotropic layer was formed in the same manner as Example 1, except that Coating liquid C1 was used in the place of Coating liquid (1), and Cellulose acylate film C1 was used as a support. In this way, Optical compensation film C1 was prepared. Re (550) of Optical compensation film C1 was 48 nm.

Using Optical compensation film C1, Polarizing Plate C1 was prepared in the same manner as Example 1; and TN mode liquid crystal display device C1 having two of Polarizing plates C1, each of which was disposed at the displaying site or the backlight side, was produced.

[Evaluation of Liquid-Crystal Display Device]

Evaluation of Yellow Color Shift in Oblique Horizontal Directions:

The liquid-crystal display devices constructed in Examples 1 and 2 and Comparative Example 1 were tested as follows: In the evaluations, the normal line direction of the display panel was defined as 0°. Regarding each of the devices in the white state, the yellow color shift $\Delta v'$ (hereinafter this may be referred to as "$\Delta v'$ (0°→60°)") was measured in the directions rotated from 0° to 60° relative to the horizontal direction of the display panel (the right and left horizontal direction of the display panel), and evaluated according to the following standards. The results are shown in the following table.

When measured $\Delta v'$ (0°-60°) was equal to or less than 0.03, the yellow color shift was not confirmed in visual check.

When measured $\Delta v'$ (0°-60°) was more than 0.03, the yellow color shift was confirmed in visual check.

Viewing Angles in All Directions:

The liquid-crystal display devices constructed in Examples 1 and 2 and Comparative Example 1 were tested using a tester "EZ-Contrast 160D" (by ELDIM). Specifically, the viewing angles of each of the devices were measured in any states of the black state (L1) to the white state (L8). The region having a contrast ratio (white transmittance/black transmittance) of equal to or more than 10 in all directions was determined as the viewing angle of the tested device. The tested devices were evaluated according to the following standards. The results are shown in the following table.

When the total of the viewing angles in all directions having attained a contrast ratio of equal to or more than 10 is equal to or more than 320°, it can be said that the device is excellent in displaying properties in actual use.

TABLE 1

| | | Example 1 | Example 2 | Comparative Example 1 |
|---|---|---|---|---|
| First optically anisotropic layer | Re (nm) | 26 | 30 | 48 |
| Second optically anisotropic layer | Re (nm) | 80 | 60 | −7 |
| | Rth (nm) | 60 | 60 | 90 |
| $\Delta v'$ (0° → 60°) | | 0.013 | 0.015 | 0.032 |
| Sum of viewing angles in all directions *1 | | 320 | 320 | 317 |

*1 Sum of viewing angles, achieving contrast of equal to or more than 10, in all of the upper, downward, rightward and leftward directions From the results in the above table, it is understood that Examples 1 and 2 of the invention had more excellent display characteristics as compared with Comparative Example 1 of a conventional TN-mode liquid-crystal display device, in that the former had wide viewing angle characteristics comparable to those of the latter and that the yellow color shift in oblique horizontal directions of the former was smaller than that of the latter.

Seven types of coating liquids were prepared in the same manner as Coating liquid (1), except that any one of the combinations Nos. 2-8 shown in Table A was used in the place of the combination of Discotic liquid crystal compound (1) and Discotic liquid crystal compound (2). Seven types of optical compensation films were produced in the same manner as Example 1, except that any one of the seven types of coating liquids was used in the place of Coating liquid (1). Using the seven types of the optical compensation films, seven types of polarizing plates and seven types of TN mode liquid crystal display devices employing them respectively were produced in the same manner as Example 1. Regarding each of the seven types liquid crystal display devices, yellow color shift in oblique horizontal directions and the viewing angles in all of upwards, downward, rightward and leftward directions were evaluated in the same manner as Example 1. And all of the evaluation results regarding the seven types of liquid crystal display devices were same as those of TN-mode liquid-crystal display device 1.

Example 3

An optical compensation film, a polarizing plate and a TN-mode liquid-crystal display device were produced in the same manner as in Example 1, for which, however, a cyclic polyolefin film produced according to the method described below was used as the second optically-anisotropic layer (Re(550)=80 nm, Rth(550)=60 nm). The test results of the device were also excellent like those of TN-mode liquid-crystal display device 1 produced in Example 1.

(Preparation of Ring-Opening Polymerized Cyclic Polyolefin)

The following composition was put into a mixing tank and stirred to dissolve the ingredients, and then the solution was filtered through a filter paper having a mean pore size of 34 μm and a sintered metal filer having a mean pore size of 10 μm.

| Cyclic Polyolefin Solution A | |
|---|---|
| Arton G (by JSR) | 150 mas. pts. |
| Methylene chloride | 550 mas. pts. |
| Ethanol | 50 mas. pts. |

Next, the following composition containing the ring-opening polymerized cyclic polyolefin solution prepared according to the above method was put into a disperser to prepare a mat agent dispersion.

| Mat Agent Dispersion | |
|---|---|
| Silica particles having a mean particle size of 16 nm (Aerosil R972, by Nippon Aerosil) | 2 mas. pts. |
| Methylene chloride | 75 mas. pts. |
| Ethanol | 5 mas. pts. |
| Cyclic polyolefin solution A | 10 mas. pts. |

100 parts by mass of the above cyclic polyolefin solution and 1.1 parts by mass of the mat agent dispersion were mixed to prepare a dope for film formation.

Using a band caster, the above dope was cast. The film having a residual solvent amount of about 22% by mass was peeled off from the band, and stretched in the width direction at a draw ratio of 50%, using a tenter. Then, this was changed from tenter transportation to roll transportation, dried at 120° C. to 140° C. and wound up. Re(550) of the thus-produced cyclic polyolefin film was 80 nm and Rth(550) thereof was 60 nm. The film was processed for glow discharge treatment between upper and lower electrodes of brass. In an argon gas atmosphere, a high frequency voltage of 3000 Hz and 4200 V was applied between the upper and lower electrodes, and the film was processed for 20 seconds therebetween thereby to give a ring-opening polymerized cyclic polyolefin film.

Example 4

An optical compensation film, a polarizing plate and a TN-mode liquid-crystal display device were produced in the same manner as in Example 1, for which, however, a film produced according to the method described below was used as the second optically-anisotropic layer (Re(550)=60 nm, Rth(550)=60 nm). The test results of the device were also excellent like those the TN-mode liquid-crystal display device of Example 1.

"ZEONOR ZF-14" (by Nippon Zeon, having a thickness of 100 μm) was stretched in the machine direction at a draw ratio of 15%, using a machine-direction uniaxial stretching machine at an aeration temperature of 140° C. and a film surface temperature of 130° C. Next, using a tenter stretching machine, this was stretched in the cross direction at a draw ratio of 35%, at an aeration temperature of 140° C. and a film surface temperature of 130° C., and then this was wound up into a roll film thereby producing a biaxially-stretched second optically-anisotropic layer.

Examples 5 to 9

Mixed were 100 parts by mass of Cyclic polyolefin solution A and 1.1 parts by mass of Mat agent solution, which was prepared in Example 3, to prepare a dope. Using a band caster, the dope was cast. The film was dried at a temperature falling with in the range from 120 to 140° C. and wound up. The obtained raw film was subjected to a stretching treatment according to a stretching method at a stretching ratio in an atmosphere of the temperature, all of which are specified in the following table. In this way, polymer films to be used as a second optically anisotropic layer were produced. Optical compensation films, polarizing plates and TN-mode liquid crystal displaying devices were produced in the same manner as Example 1, except that each of the polymer films was used as a second optically anisotropic layer. Regarding each of the seven types liquid crystal display devices, yellow color shift Δv' (0°→60°) in oblique horizontal directions observed in the white state and the viewing angles, achieving contras equal to or higher than 10, in all of upwards, downward, rightward and leftward directions were evaluated in the same manner as Example 1. The results were shown in the following table.

| | | Example 5 | Example 6 | Example 7 | Example 8 | Example 9 |
|---|---|---|---|---|---|---|
| Stretching method*1 | | Fixed | Free | Free | Fixed | Free |
| Stretching ratio % | | 29 | 10 | 13 | 60 | 19 |
| Stretching temperature ° C. | | 180 | 175 | 175 | 185 | 175 |
| Second optically anisotropic layer | Re (nm) | 56 | 63 | 74 | 80 | 102 |
| | Rth (nm) | 81 | 41 | 48 | 76 | 68 |

*1"Fixed" indicates carrying out a fixed-edge uniaxial stretching, and "Free" indicates carrying out a free-edge uniaxial stretching.

TABLE 2

| | | Example 5 | Example 6 | Example 7 | Example 8 | Example 9 |
|---|---|---|---|---|---|---|
| First optically anisotropic layer | Re (nm) | 26 | 26 | 26 | 26 | 26 |

TABLE 2-continued

|  |  | Example 5 | Example 6 | Example 7 | Example 8 | Example 9 |
|---|---|---|---|---|---|---|
| Second optically anisotropic layer | Re (nm) | 56 | 63 | 74 | 80 | 102 |
|  | Rth (nm) | 81 | 41 | 48 | 76 | 68 |
| Δv' (0° → 60°) |  | 0.015 | 0.016 | 0.017 | 0.015 | 0.018 |
| Sum of viewing angles in all directions*1 |  | 320 | 320 | 320 | 320 | 320 |

*1 Sum of viewing angles, achieving contrast of equal to or more than 10, in all of the upper, downward, rightward and leftward directions From the results in Table 2, it is understood that Examples 5 to 9 of the invention had more excellent display characteristics as compared with Comparative Example 1 of a conventional TN-mode liquid-crystal display device, in that the former had wide viewing angle characteristics comparable to those of the latter and that the yellow color shift in oblique horizontal directions of the former was smaller than that of the latter.

Examples 10 to 13

Optical compensation films, polarizing plates and TN-mode liquid crystal display devices were produced in the same manner as Example 1, except that coating liquids for a first optically anisotropic layer were prepared by using the amounts of methyl ethyl ketone shown in the following table respectively and, using each of the coating liquids, each of first optically anisotropic layers having Re (550) as shown in the following table was prepared. And evaluations were carried out in the same manner as Example 1. The results were shown in the following table.

Comparative Example 2

An optical compensation film, polarizing plate and TN-mode liquid crystal display device were produced in the same manner as Example 1, except that coating liquid for a first optically anisotropic layer was prepared by using the amount of methyl ethyl ketone shown in the following table and, using the coating liquid, a first optically anisotropic layer having Re (550) as shown in the following table was prepared. And evaluations were carried out in the same manner as Example 1. The results were shown in the following table.

|  | Example 10 | Example 11 | Example 12 | Example 13 | Comparative Example 2 |
|---|---|---|---|---|---|
| Methyl ethyl ketone (mas. pts.) | 332.0 | 284.0 | 234.0 | 213.0 | 145.0 |
| Re (nm) *1 | 24 | 27 | 31 | 33 | 42 |

*1 Re (550) of a first optically anisotropic layer.

TABLE 3

|  |  | Example 10 | Example 11 | Example 12 | Example 13 | Comparative Example 2 |
|---|---|---|---|---|---|---|
| First optically anisotropic layer | Re (nm) | 24 | 27 | 31 | 33 | 42 |

TABLE 3-continued

|  |  | Example 10 | Example 11 | Example 12 | Example 13 | Comparative Example 2 |
|---|---|---|---|---|---|---|
| Second optically anisotropic layer | Re (nm) | 80 | 80 | 80 | 80 | 80 |
|  | Rth (nm) | 60 | 60 | 60 | 60 | 60 |
| Δv' (0° → 60°) |  | 0.023 | 0.016 | 0.018 | 0.018 | 0.033 |
| Sum of viewing angles in all directions *1 |  | 320 | 320 | 320 | 320 | 291 |

*1 Sum of viewing angles, achieving contrast of equal to or more than 10, in all of the upper, downward, rightward and leftward directions From the results in Table 3, it is understood that Examples 10 to 13 of the invention had more excellent display characteristics as compared with Comparative Example 1 of a conventional TN-mode liquid-crystal display device, in that the former had wide viewing angle characteristics comparable to those of the latter and that the yellow color shift in oblique horizontal directions of the former was smaller than that of the latter.

From the results in the above table, it is understood that Examples 1 to 13 of the invention had more excellent display characteristics as compared with Comparative Example 2, in that the former had wide viewing angle characteristics comparable to those of the latter and that the yellow color shift in oblique horizontal directions of the former was smaller than that of the latter.

The fact that the same results as in the above-mentioned Examples can be obtained in all combinations of a first optically-anisotropic layer having Re(550) of from 20 to 40 nm and a second optically-anisotropic layer having Re(550) of from 20 to 150 nm and Rth(550) of from 40 to 110 nm was confirmed according to the following simulation.

Concretely, Thing-Tech's LCD Master Ver. 6.08 was used for optical computation. The liquid-crystal cell, the electrode, the substrate and the polarizing plate that are originally in a conventional liquid-crystal display device can be used as they are. As the liquid-crystal material, used was ZLI-4792 attached to LCD Master. The liquid-crystal molecules in the liquid-crystal layer in the liquid-crystal cell were aligned as a horizontal alignment state of parallel alignment at a pretilt angle of 5°; a pair of substrate were combined with a cell gap of 5.2 microns; and a liquid-crystal material having positive dielectric anisotropy was used, and the retardation of the liquid crystal (that is, the product of the thickness d (micron) of the liquid-crystal layer, and the refractivity anisotropy Δn thereof, Δn·d) was 400 nm. As the polarizing film, used was HLC2-5618 attached to LCD Master. The voltage to be applied to the liquid-crystal layer was 1.8 V in the white state, and was 5.6 V in the black state. In the black state, the tilt angle of the liquid-crystal compound molecules positioned in the vicinity of the substrate in the liquid-crystal layer was 10°, and the tilt angle of the liquid-crystal compound molecules positioned in the center in the thickness direction of the liquid-crystal layer was 70°. The tilt angle of the liquid-crystal compound molecules in the first optically-anisotropic layer was changed variously around a standard case, settled as the center of the changed cases, where the tilt angle θ1 of the liquid-crystal compound molecules positioned on the liquid-crystal cell side in the optically-anisotropic layer is nearly the same as the tilt angle of the liquid-crystal compound molecules in the center in the thickness direction of the liquid-crystal layer, and where the tilt angle θ2 of the liquid-crystal compound molecules positioned on the polarizing film side in the optically-anisotropic layer is nearly the same as the tilt angle of the liquid-crystal compound molecules positioned in the vicinity of the substrate in the liquid-crystal layer; and the intended Re of the thus-tested samples was determined. In this, the second optically-anisotropic layer adjacent to the polarizing film was presumed to be a cellulose acylate film, and as its parameters, used were the found data of a triacetyl cellulose film (having a thickness of 80 μm, "TD80UF" by FUJIFILM) and the optical characteristic values of supports having various Re and Rth. As the light source, used as the C light source attached to LCD Master.

TN-mode liquid-crystal display devices that are the same as those of the above-mentioned Examples 1 and 2 and Comparative Example 1 were simulated according to the simulation computation, thereby determining Δv' (0°→60°) in the white state and the total of the viewing angles in all directions capable of attaining the contrast of at least 10. The results are shown in the following table 4.

TABLE 4

|  |  | Example 1 | Example 2 | Comparative Example 1 |
|---|---|---|---|---|
| First optically anisotropic layer | Re (nm) | 26 | 30 | 48 |
| Second optically anisotropic layer | Re (nm) | 80 | 60 | −7 |
|  | Rth (nm) | 60 | 60 | 90 |
| Δv' (0° → 60°) |  | 0.021 | 0.0266 | 0.033 |
| Sum of viewing angles in all directions *1 |  | 328 | 350 | 315 |

*1 Sum of viewing angles, achieving contrast of equal to or more than 10, in all of the upper, downward, rightward and leftward directions It is understood that the simulation computation results shown in Table 4 may be nearly the same as the found data shown in Table 1.

The computation results obtained by varying Re(550) of the first optically-anisotropic layer and Re(550) and Rth(550) of the second optically-anisotropic layer are shown in Table 4 shown below.

TABLE 5

|  |  | Sample*2 | | | | | |
|---|---|---|---|---|---|---|---|
|  |  | 1(I) | 2(C) | 3(I) | 4(C) | 5(I) | 6(C) |
| First optically anisotropic layer | Re (nm) | 37 | 42 | 22 | 18 | 23 | 23 |
| Second optically anisotropic layer | Re (nm) | 80 | 80 | 120 | 120 | 150 | 160 |
|  | Rth (nm) | 80 | 80 | 40 | 40 | 40 | 40 |
| Δv' (0° → 60°) |  | 0.0275 | 0.0303 | 0.0182 | 0.0145 | 0.0187 | 0.0182 |
| Sum of viewing angles in all directions*1 |  | 350 | 323 | 350 | 314 | 350 | 319 |

|  |  | Sample*2 | | | | | |
|---|---|---|---|---|---|---|---|
|  |  | 7(I) | 8(C) | 9(I) | 10(C) | 11(I) | 12(C) |
| First optically anisotropic layer | Re (nm) | 37 | 37 | 40 | 40 | 32 | 30 |
| Second optically anisotropic layer | Re (nm) | 30 | 10 | 40 | 40 | 80 | 80 |
|  | Rth (nm) | 80 | 80 | 100 | 120 | 40 | 20 |
| Δv' (0° → 60°) |  | 0.028 | 0.029 | 0.023 | 0.02 | 0.0298 | 0.0286 |
| Sum of viewing angles in all directions*1 |  | 349 | 277 | 343 | 288 | 350 | 309 |

*1 Sum of viewing angles, achieving contrast of equal to or more than 10, in all of the upper, downward, rightward and leftward directions
*2 "I" indicates a sample satisfying the conditions of the invention, and "C" indicates a sample not satisfying the conditions of the invention.

Figure 5:
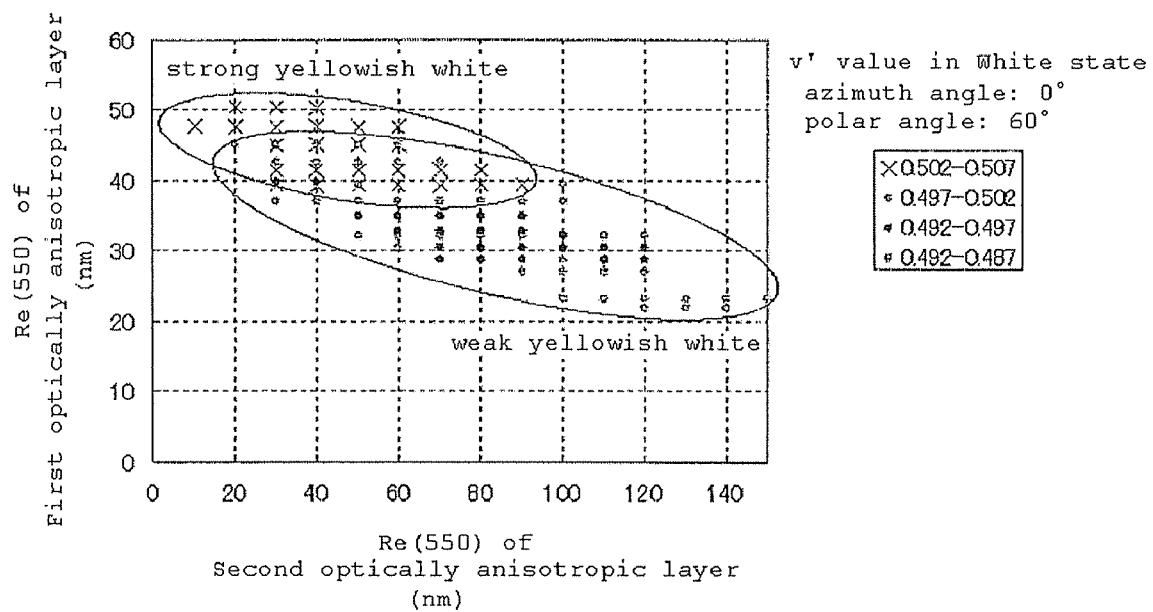
FIG. 5 is a graph showing the results in Examples.

Various samples in which Rth(550) of the second optically-anisotropic layer falls within a range of from 40 to 120 nm were computed in the manner as above; those of which the total of the viewing angles in all directions capable of attaining a contrast of at least 10 is at least 320° were plotted on the graph of FIG. 5 in which the vertical axis indicates Re(550) of the first optically-anisotropic layer and the horizontal axis indicates Re(550) of the second optically-anisotropic layer. In FIG. 5, the plotting marks are changed in the graph, in accordance with the value of v' of each sample at an azimuth angle of 0° and a polar angle of 60° in the white state (this is larger when the degree of yellow color shift is larger). The results in FIG. 5 confirm that the samples having Re(550) of the first optically-anisotropic layer of from 20 to 40 nm and having Re(550) of the second optically-anisotropic layer of from 20 to 150 nm and Rth(550) thereof of from 40 to 110 nm all have a small value of v'.

Additional experiments for confirming the simulation computation results were carried out.
(Sample 1)

An optical compensation film, polarizing plate and TN-more liquid crystal display device were produced in the same manner as Example 1, except that first and second optically anisotropic layers were prepared in the manner describe below.

(Preparation of Second Optically Anisotropic Layer (Cellulose Acetate Film A))

Using a band caster, the above-mentioned dope was cast. After the film having a residual solvent content of about 60% by mass was peeled away from the band. The film was fed by the tenter, and dried at Held by tenter clips, this was stretched along the TD direction evenly, and dried at 110° C. for five minutes and at 140° C. for ten minutes. In this way, a raw cellulose acetate film having a thickness of 160 μm was obtained. It was found that Tg of the film was 140° C.

| Cellulose acetate solution A | |
|---|---|
| Ingredient | |
| Cellulose acylate having a degree of acetate substitution of 2.94 | 100 mas. pts. |
| Methylene chloride (first solvent) | 517.6 mas. pts. |
| Methanol (second solvent) | 77.3 mas. pts. |
| Silica particles having a mean particle size of 16 nm (AEROSIL R972 produced by AEROSIL JAPAN) | 0.13 mas. pts. |
| Compound for controlling optical anisotropy (Compound AA-1 shown below) | 11.7 mas. pts. |
| Ester of citric acid | 0.01 mas. pts. |

Compound AA-1

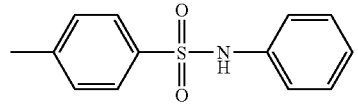

<<Stretching Treatment Step>>

Using a roll stretching machine, the obtained raw cellulose acetate film was subjected to a uniaxial stretching treatment along the MD direction. The conditions of the stretching treatment were as follows. As rolls of the roll stretching machine, induced heating jacket rolls, of which surfaces were subjected to a mirror finish treatment, were used; the temperature of each of the rolls was controlled independently. The stretching ration was adjusted by controlling the circumferential speeds of the nip rolls. The aspect ratio (the length between the nip rolls/the width of the base entrance) was adjusted to 0.5, the stretching ratio was adjusted to 10%/min. with respect to the length between stretching steps. The stretching ration was adjusted to 5%, and the temperature was adjusted to 150° C.

It is to be noted that the stretching ratio was obtained as follows. Gauge lines were drawn on the sample film at the certain intervals along both of the MD and TD directions. The distances between the gauge lines were measured before and after the stretching treatment respectively, and the stretching ration was calculated with the following definition by using the measured values.

Stretching ratio of a sample film (%)=100× $(Da-Db)/Db$

"Da" indicates a distance between the gauge lines after the stretching treatment, and "Db" indicates distance between the gauge lines before the stretching treatment.

<<Thermal Treatment Step>>

The cellulose acetate film was subjected to a thermal treatment while the edges of the film were grasped by tenter clips and the distance between the clips grasping the edges of the film was controlled, so that the dimensional change could not occur. The film was left in a heating zone at 200° C. for ten minutes. In this way, Cellulose acetate film A was produce.

Re(550) of Cellulose acetate A was 80 nm, and Rth(550) thereof was 80 nm.

An alignment layer was formed on a surface of Cellulose acetate film A, in the same manner as Example 1.

(Preparation of First Optically Anisotropic Layer)

Coating liquid for a first optically anisotropic layer having a same formulation as that of Coating liquid (1) prepared in Example 1, except that the amount of methyl ethyl ketone was changed to 179.0 parts by mass. The obtained coating liquid was applied to a rubbed surface of the alignment layer using a #1.6 wire bar. Then this was heated in a constant-temperature bath at 120° C. for 90 seconds to align the discotic liquid crystal compound. Next, this was irradiated with UV rays by using a high-pressure mercury lamp of which output power was 160 W/cm for one minute to thereby promote the crosslinking reaction to fix the aligned discotic liquid-crystal compound. Next, this was left cooled to room temperature. In this way, a first optically anisotropic layer and an optical compensation film having thereon were produced. The discotic liquid crystal compound used in this example was the compound shown in Table A as No. 1.

Re (550) of the obtained first optically anisotropic layer was 37 nm.

In this way, an optical compensation film was prepared. Using the optical compensation film, a polarizing plate and TN-mode liquid crystal display device were produced in the same manner as Example 1; and the evaluations were carried out in the same manner as Example 1. the result were shown in Table 5.

(Samples 2 to 12)

Optical films, polarizing plates and TN-mode liquid crystal display devices of Samples 2 to 12 were produced in the same manner as the method for preparing Sample 1, except that the first and second optically anisotropic layers were prepared in the manner described below.

More specifically, raw cellulose acetate films having a thickness specified in the following table were prepared and subjected to a stretching treatment with a stretching ratio specified in the following table. In this way, cellulose acetate films having Re (550) and Rth (550) specified in the following table were produced, and used as a second optically anisotropic layer respectively.

| | | Sample 2 | Sample 3 | Sample 4 | Sample 5 | Sample 6 |
|---|---|---|---|---|---|---|
| Thickness (μm)*1 | | 160 | 80 | 80 | 80 | 80 |
| Stretching ratio (%) | | 5 | 20 | 20 | 30 | 32 |
| Second optically anisotropic layer | Re (nm) | 80 | 123 | 123 | 149 | 158 |
| | Rth (nm) | 80 | 41 | 41 | 42 | 44 |

-continued

|  |  | Sample 7 | Sample 8 | Sample 9 | Sample 10 | Sample 11 | Sample 12 |
|---|---|---|---|---|---|---|---|
| Thickness (μm)*1 |  | 160 | 160 | 200 | 240 | 80 | 40 |
| Stretching ratio (%) |  | 2 | 0.6 | 2 | 1 | 16 | 30 |
| Second optically anisotropic layer | Re (nm) | 27 | 7 | 40 | 35 | 80 | 75 |
|  | Rth (nm) | 81 | 80 | 107 | 114 | 40 | 24 |

*1A thickness of each raw cellulose acetate film.

Optical compensation films of Samples 2 to 12 were produced in the same manner as the method for producing Sample 1, except that coating liquids for a first optically anisotropic layer were prepared by using the amounts of methyl ethyl ketone shown in the following table respectively and, using each of the coating liquids, each of first optically anisotropic layers having Re (550) as shown in the following table was prepared.

|  |  | Sample 2 | Sample 3 | Sample 4 | Sample 5 | Sample 6 |
|---|---|---|---|---|---|---|
| Methyl ethyl ketone (mas. pts.) |  | 145 | 372 | 478 | 352 | 352 |
| First optically anisotropic layer | Re (nm) | 42 | 22 | 18 | 23 | 23 |

|  |  | Sample 7 | Sample 8 | Sample 9 | Sample 10 | Sample 11 | Sample 12 |
|---|---|---|---|---|---|---|---|
| Methyl ethyl ketone (mas. pts.) |  | 179 | 179 | 156 | 156 | 223 | 245 |
| First optically anisotropic layer | Re (nm) | 37 | 37 | 40 | 40 | 32 | 30 |

Using the optical compensation films of Samples 1 to 12, polarizing plates and TN-mode liquid crystal display devices were produced in the same manner Example 1; and the evaluations were carried out in the same manner as Example 1.

It was confirmed that the evaluation results of Sample 1 to 12, regarding Δv' (0°→60°) and a sum of viewing angles achieving a contrast equal to or higher than 10 in all of the upward, downward, rightward and leftward directions, were same as the simulation computation results of Sample 1 to 12 respectively.

The invention claimed is:

1. An optical compensation film comprising, at least, first and second optically-anisotropic layers, wherein:
retardation in plane at a wavelength of 550 nm, Re(550), of the first optically-anisotropic layer is from 20 to 40 nm, the first optically-anisotropic layer does not have any direction in which its retardation at a wavelength of 550 nm is 0 nm, the direction in which the absolute value of retardation of the first optically-anisotropic layer is the smallest is neither in the normal line direction of the layer nor in the in-plane direction thereof, and
Re(550) of the second optically-anisotropic layer is from 20 to 150 nm and retardation along thickness direction at a wavelength of 550 nm, Rth(550), thereof is from 40 to 110 nm.

2. The optical compensation film of claim 1, wherein the second optically-anisotropic layer is a cellulose acylate film.

3. The optical compensation film of claim 1, wherein the second optically-anisotropic layer is a norbornene-type polymer film, a cyclic olefin-type polymer film or a polycarbonate film.

4. The optical compensation film of claim 1, which is an optical compensation film to be used for TN-mode liquid-crystal display devices.

5. A polarizing plate comprising an optical compensation film as set forth in claim 1 and a polarizing film, wherein the in-plane slow axis of the optical compensation film and the in-plane transmission axis of the polarizing film is parallel to each other.

6. A liquid-crystal display device comprising:
a liquid-crystal cell comprising a pair of substrates at lease one of which has an electrode and which are disposed to face each other, and a liquid-crystal layer sandwiched between the pair of substrates and containing a nematic liquid-crystal material in which liquid-crystal molecules of the nematic liquid-crystal material are aligned vertically to the surfaces of the pair of substrates in the black state,
a first polarizing film and a second polarizing film disposed to sandwich the liquid-crystal cell therebetween, and
two optical compensation films as set forth in claim 1, one of which is disposed between the liquid-crystal layer and the first polarizing film and another of which is disposed between the liquid-crystal layer and the second polarizing film.

* * * * *